(12) United States Patent
Cook

(10) Patent No.: US 7,973,789 B2
(45) Date of Patent: Jul. 5, 2011

(54) DYNAMIC MODEL GENERATION METHODS AND APPARATUS

(75) Inventor: Robert L. Cook, San Anselmo, CA (US)

(73) Assignee: Pixar, Emeryville, CA (US)

(*) Notice: Subject to any disclaimer, the term of this patent is extended or adjusted under 35 U.S.C. 154(b) by 892 days.

(21) Appl. No.: 11/422,024

(22) Filed: Jun. 2, 2006

(65) Prior Publication Data

US 2006/0274076 A1    Dec. 7, 2006

Related U.S. Application Data

(60) Provisional application No. 60/687,189, filed on Jun. 3, 2005, provisional application No. 60/762,297, filed on Jan. 25, 2006.

(51) Int. Cl.
*G06T 17/00* (2006.01)
(52) U.S. Cl. ........ 345/420; 345/419; 345/423; 345/426; 345/581; 345/642; 345/473; 382/154; 382/209; 315/369; 315/370
(58) Field of Classification Search .................. 345/419, 345/420, 473, 642, 423, 581; 382/154, 209; 166/120, 140, 196; 315/369, 370
See application file for complete search history.

(56) References Cited

U.S. PATENT DOCUMENTS

| | | | |
|---|---|---|---|
| 4,897,806 A | 1/1990 | Cook et al. | |
| 5,448,690 A | 9/1995 | Shiraishi et al. | |
| 5,455,900 A | 10/1995 | Shiraishi et al. | |
| 5,481,307 A | 1/1996 | Goldstein et al. | |
| 5,739,826 A | 4/1998 | Shiraishi et al. | |
| 5,864,342 A | 1/1999 | Kajiya et al. | |
| 5,926,184 A | 7/1999 | Shimizu | |
| 6,057,849 A | 5/2000 | Haubner et al. | |
| 6,271,848 B1 | 8/2001 | Yasui et al. | |
| 6,300,956 B1 | 10/2001 | Apodaca et al. | |
| 6,525,726 B1 | 2/2003 | Xie et al. | |
| 6,538,651 B1* | 3/2003 | Hayman et al. | 345/419 |
| 6,674,911 B1 | 1/2004 | Pearlman et al. | |
| 6,697,063 B1 | 2/2004 | Zhu | |
| 6,728,422 B1 | 4/2004 | Weiss | |
| 6,914,618 B2 | 7/2005 | Weiss | |
| 7,095,409 B2 | 8/2006 | Cook et al. | |
| 7,102,636 B2* | 9/2006 | Reshetov et al. | 345/420 |
| 7,265,692 B2 | 9/2007 | Martin et al. | |
| 2002/0041327 A1 | 4/2002 | Hildreth et al. | |
| 2002/0080143 A1* | 6/2002 | Morgan et al. | 345/581 |
| 2002/0171644 A1 | 11/2002 | Reshetov et al. | |

(Continued)

OTHER PUBLICATIONS

Deussen, et al., "Interactive visualization of complex plant ecosystems", Proceedings of the Conference on Visualization '02, Boston, Massachusetts, Oct. 27-Nov. 1, 2002, IEEE, pp. 219-226.*

(Continued)

*Primary Examiner* — Kimbinh T Nguyen
(74) *Attorney, Agent, or Firm* — Kilpatrick Townsend & Stockton LLP

(57) ABSTRACT

A method for a computer system includes opening a model of an object, wherein the model comprises a plurality of geometric elements, determining a subset of geometric elements from the plurality of geometric elements of the model, modifying properties of one or more of the geometric elements in the subset of geometric elements to form a modified subset of geometric elements, and using the modified subset of geometric elements to represent the model of the object in the computer system.

34 Claims, 17 Drawing Sheets

U.S. PATENT DOCUMENTS

2009/0167763 A1* 7/2009 Waechter et al. ............. 345/426

OTHER PUBLICATIONS

Stamminger et al. "Interactive Sampling and Rendering for Complex and Procedural Geometry", Published 2004.*

Candussi et al. "Rendering Realistic Trees and Forests in Real Time", Eurographics 2005.*

Weber et al. "Creation and Rendering of Realistic Trees". ACM 1995.*

Chover et al. "Texture, Displacement and Immersion: A Model for Tree Rendering". Published 1999.*

Bloomenthal "Modeling the Mighty Maple". Published 1985.*

Mueller et al. "Multi-Texture Modeling of 3D traffic Scenes". IEEE 2003.*

Clark, "Hierarchical Geometric Models for Visible Surface Algorithms," Communications of the ACM, vol. 19, No. 10, Oct. 1976, pp. 547-554.

Cook, "Stochastic Sampling in Computer Graphics," ACM Transactions on Graphics, vol. 5, No. 1, Jan. 1986, pp. 51-72.

Cook et al., "The Reyes Image Rendering Architecture," Proceedings of the 14th Annual Conference on Computer Graphics and Interactive Techniques, M.C. Stone, Ed., SIGGRAPH '87, ACM, New York, NY, pp. 95-102.

Cohen et al., Wang Tiles for Image and Texture Generation, ACM SIGGRAPH 2003 Papers, Jul. 27-31, 2003, SIGGRAPH'03, ACM, New York, NY, pp. 287-294.

Dippé et al., "Antialiasing Through Stochastic Sampling," SIGGRAPH Computer Graphics, vol. 19, No. 3, Jul. 1985, pp. 69-78.

Haeberli et al., "The Accumulation Buffer: Hardware Support for High-Quality Rendering," Proceedings of the 17th Annual Conference on Computer Graphics and Interactive Techniques, SIGGRAPH '90, ACM, New York, NY pp. 309-318.

Kirk et al., "Unbiased Sampling Techniques for Image Synthesis," Proceedings of the 18th Annual Conference on Computer Graphics and Interactive Techniques, SIGGRAPH '91, ACM, New York, NY, pp. 153-156.

Mao, "Splatting of Non Rectilinear Volumes Through Stochastic Resampling," IEEE Transactions on Visualization and Computer Graphics, Jun. 1996, vol. 2, No. 2, pp. 156-170.

Ostromoukhov et al., "Fast Hierarchical Importance Sampling with Blue Noise Properties," ACM SIGGRAPH 2004 Papers, Aug. 8-12, 2004, J. Marks, Ed., SIGGRAPH '04, ACM, New York, NY, pp. 488-495.

Reeves et al., "Rendering Antialiased Shadows with Depth Maps," Proceedings of the 14th Annual Conference on Computer Graphics and Interactive Techniques, M. C. Stone, Ed., SIGGRAPH '87, ACM, New York, NY, pp. 283-291.

Wand et al., "The Randomized Z-Buffer Algorithm: Interactive Rendering of Highly Complex Scenes," Proceedings of the 28th Annual Conference on Computer Graphics and Interactive Techniques, SIGGRAPH '01, ACM, New York, NY, pp. 361-370.

Zwicker et al., "EWA Splatting," IEEE Transactions on Visualization and Computer Graphics, Jul.-Sep. 2002, vol. 8, No. 3, pp. 223-238.

Office Action U.S. Appl. No. 11/422,044 dated Mar. 13, 2009.

* cited by examiner

*u* as a function of *z* at different pruning rates.

For smaller values of *u*, more elements are pruned (have 0 area), and the remaining elements are enlarged more.

Contrast correction is more important for aggressive pruning (small *h*). Parameters: $k_1 = 1$, $k_{max} = 121$

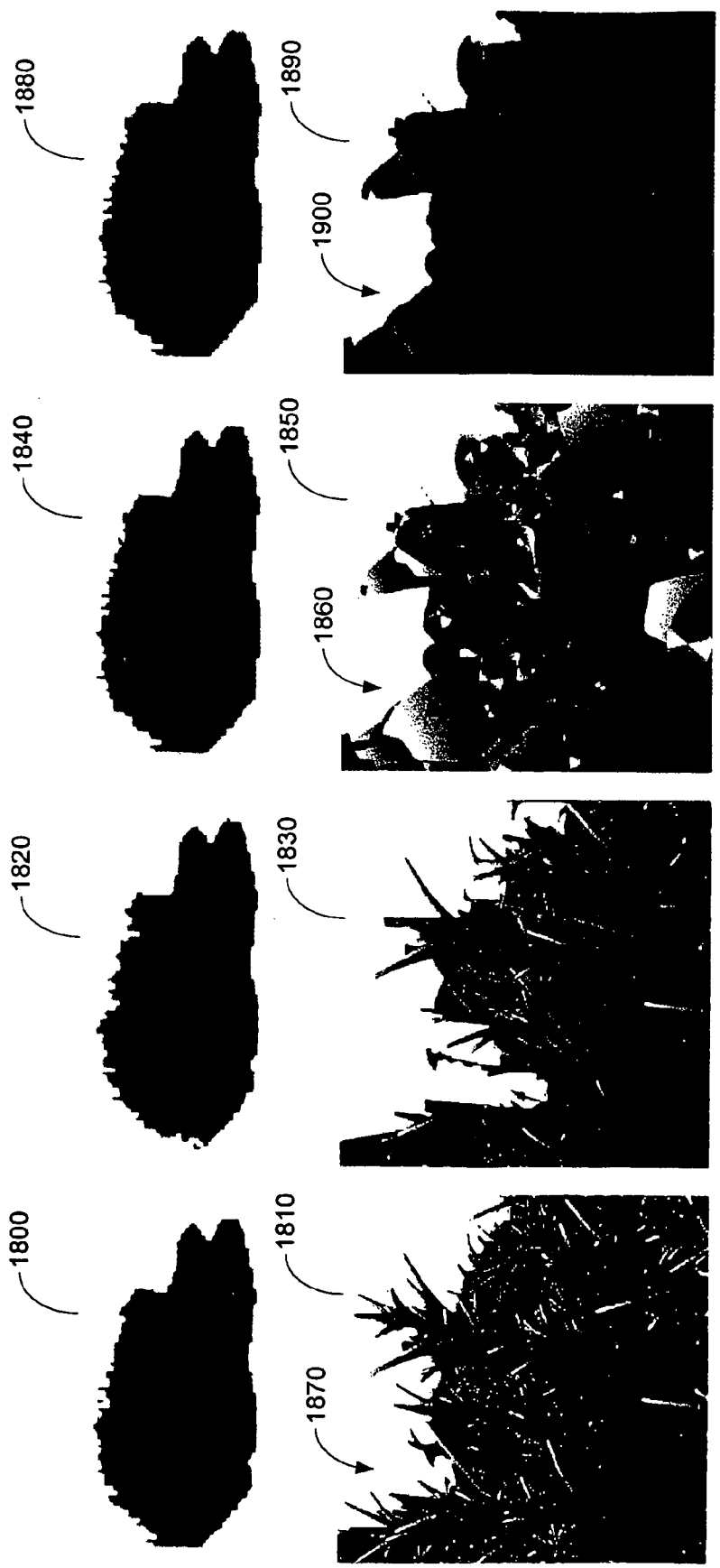

Ratio of rendering time and memory use with and without pruning as a function of distance for the animation in the supplementary material of the plant receding into the distance.

DYNAMIC MODEL GENERATION METHODS AND APPARATUS

CROSS-REFERENCE TO RELATED APPLICATIONS

The present application claims priority to Provisional Application No. 60/687,189, filed Jun. 3, 2005 and Provisional Application No. 60/762,297, filed Jan. 25, 2006. These disclosures are hereby incorporated by reference in their entirety for all purposes. The present application is related to U.S. application Ser. No. 11/422,044, filed Jun. 2, 2006, titled: Methods And Apparatus For Structuring Geometric Models.

BACKGROUND OF THE INVENTION

The present invention relates to computer animation. More specifically, the present invention relates to methods and apparatus for dynamically determining models for computer animation.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006) and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects into a two dimensional image. The named inventor of the present invention co-developed the original RenderMan® software.

The inventor of the present invention has recognized that reducing rendering time is very important for computer animation. The rendering process can be a time consuming operation that may take hours, if not days, when rendering an image with many objects. As an example, if a scene included ten thousand plants, each with a million leaves, the rendering engine would have to process ten billion leaves in the scene. Accordingly, the time to render such a scene would be unacceptably long and would require massive amounts of memory. Multiplying this rendering time by the number of frames (e.g. 130,000) in a typical feature-length animated feature images results in a rendering time that is impractical.

One technique developed by Pixar engineers to reduce rendering time, and not in the prior art, has been to reconfigure the rendering pipeline. The current RenderMan® software is based upon a "bucket" by "bucket" rendering engine architecture, where images are rendered one at a time. In U.S. application Ser. No. 10/428,325, filed Apr. 30, 2003, Pixar discloses a new and pioneering rendering engine architecture where objects are rendered for a "shot" of images at a time. By using such an architecture, the rendering times for a shot of images is greatly reduced because objects are retrieved from a disk once, for a series of images in the shot. Other advantages are also discussed in that application.

Another technique considered to attempt to reduce the rendering time has been through the manual definition and use of distinctly different level of detail (LOD) models for an object. In such cases, high LOD (complex) objects are replaced with lower LOD (simple) objects when objects are "far away" from the viewing plane. Because the lower LOD objects are geometrically simpler than the high LOD objects, the rendering engine generally performs fewer calculations. Accordingly, the rendering process is expected to be improved.

One drawback to the LOD technique has been that when transitioning between a high LOD model to a low LOD model, undesirable visual artifacts appear. As an example, because the high LOD model and the lower LOD model are geometrically different, surfaces of the object rendered in different images may have different surface normals, and the like. Although such artifacts may not be visible on an individual image, when a viewer views images consecutively, such as when watching a feature, the artifacts appear as distracting "sparkles" or "pops" to a viewer.

One solution developed by Pixar engineers to reduce the undesirable artifacts of LOD transitions was described in U.S. Pat. No. 6,300,956. In this patent, to provide a smoother transition between LOD models, stochastic sampling techniques were introduced on a pixel-by-pixel basis to determine which of the LOD models contributes to the final image. Stochastic (pseudo-random) sampling techniques was first invented for use in computer animation by the named inventor of the present invention, and is described in U.S. Pat. No. 4,897,806, assigned to Pixar.

Another drawback to the LOD techniques has been that it requires a manual definition of the different LOD models for the object. In some cases, three or more different LOD models must be manually designed. Definition of these different LOD models is very time consuming, especially when the object is complex.

Some techniques have been described that provide for formation of one LOD model based upon another LOD model. One technique typically relies upon selective removal or replacement of vertices from surface descriptions in a high LOD model to form a lower LOD model.

Drawbacks to the LOD surface simplification approach include that such computations are extremely time consuming when processing typical computer animation models. For example, procedurally created models for computer animation may include millions of geometric elements, each of which could be simplified according to the above techniques. Another drawback to such techniques includes that LOD simplifications are typically directed to simplification via removal of vertices from an object and not via removal of higher-level geometric elements of an object, e.g. leaves, hair. Yet another drawback includes that when a vertex is removed using LOD simplification, the techniques fail to consider the effect of simplification on the over-all properties of the object, e.g. surface area, contrast, etc.

Accordingly, what is desired are improved methods and apparatus for solving the problems discussed above, while reducing the drawbacks discussed above.

BRIEF SUMMARY OF THE INVENTION

The present invention relates to computer animation. More specifically, the present invention relates to methods and apparatus for dynamically determining object models. The models may be used for a variety of computer animation applications, including object rendering, object simulation, scene visualization, scene lighting, and the like.

This disclosure introduces the term "stochastic pruning" which is a Monte Carlo-type sampling technique for automatically simplifying objects made of a large number of geometric elements. In various embodiments, when there are a large number of elements (e.g. geometric elements, surfaces) that contribute to appearance of a pixel on an image, the color of the pixel is approximated from a subset of the elements. In various embodiments, properties of the subset of elements may be altered to better represent the large number of elements for the pixel. The unused elements are "pruned." In various embodiments, "pruned" may simply refer to the elements of the object that are not used to represent the object, e.g. elements of the object that are not loaded from disk memory to CPU memory, or the like.

Various embodiments of the present invention may be easily implemented within a conventional rendering pipeline. By doing so, embodiments enable rendering scenes with very high geometric complexity (e.g. 10,000,000, or 100,000,000 geometric elements) without sacrificing image quality. Without embodiments of the present invention, such scenes may not even be renderable in state of the art rendering systems because of the massive amounts of memory that would be required.

At least four different aspects of various embodiments will be described below.

1. Pruning order. Determining which elements preferentially represent an object.

2. Area preservation. Modifying geometric properties of the elements used to represent an object. For example, increasing surface areas of the elements such that the total area of the object does not change.

3. Contrast preservation. Modifying surface properties of the elements used to represent an object. For example, modifying the shading (e.g. colors) of the elements such that the contrast of image does not change.

4. Smooth animation. Modifying how the elements used to represent an object are smoothly transitioned. For example, fading in/out of various elements to reduce pop-on or pop-off.

The embodiments of the present invention provide methods for dynamically creating and using reduced geometric complexity models of an object based upon using a subset of the geometric elements. In various embodiments, the reverse pruning order list represents a listing of geometric elements of which a subset may represent the original object. For example, the first 25% of the geometric elements specified in an RPO list may be used to represent the object, using the techniques described below; the first 40% of the geometric elements may be used to represent the object, and the like. Accordingly, the subset of geometric elements is used to represent the original object. In some embodiments, all geometric elements of an object may be ordered in an RPO list, and in other embodiments, less than all geometric elements may be ordered in an RPO list, and the remaining geometric elements may or may not be placed in some order.

The criteria for selecting the subset of geometric elements may be based upon any number of factors. For example, one factor is proximity in space of geometric elements. Another factor may be the color of the geometric elements. For example, the geometric elements may be selected such that the average color of the geometric elements is brought closer to the mean or variance of the geometric elements in the overall model. In still other embodiments, combinations of factors may be used to determine the subset of geometric, such as color statistics, proximity in space, and the like. In various embodiments, the geometric elements in the object are pre-assigned a specified priority order for inclusion in this subset (e.g. a reverse pruning order (RPO) list). In some embodiments, the geometric elements in the subset may be modified to better maintain the overall appearance of the object.

Various methods for determining the pruning order include random sampling, sampling with Poisson-disk constraints (i.e. spatial sampling distribution constraints), sampling with temporal sampling distribution constraints, pseudo-random (e.g. jittered) sampling, stratified sampling, and the like. Additionally, in various embodiments, heuristic knowledge regarding the geometry of the object may be considered. In various embodiments, the ordering of geometric elements in the reverse pruning order list is not correlated with position, normal, color, or the like of the geometric element.

In some embodiments of the present invention, a reverse pruning order model (RPO) of an object is formed by selecting geometric elements in an object model and specifying a position within a reverse pruning order list, or the like. In some embodiments of the present invention, a restriction function R may be used to determine whether a selected geometric element from an object model is added to the reverse pruning order list. The restriction function R may be a function of some or all of the previous geometric elements in the reverse pruning order list, and/or a function of the order geometric elements are added to the list. Additionally, in various embodiments, a geometric element may be added to the list when the geometric element has the lowest R is identified, a geometric element may be added when the geometric element with R<threshold is identified, and/or a geometric element may be added when randomly selected from geometric elements with R<threshold, and/or selected based upon a probability value that is a function of R. The restriction function R may vary according to either the number or percentage of geometric elements in the reverse pruning order list and/or the number or percentage of geometric elements that have not yet been placed on the list. In various embodiments, the function R may also depend upon the location of the candidate geometric element, the contrast, the importance, the position in a scene, the lighting, and the like.

In various embodiments, the ordered model may be generated when a simplified model of an object is required, or the ordered model may be pre-computed. Additionally, the geometric elements may be stored in-order within the model, or stored out-of-order along with a pointer table, or the like that indicates the reverse pruning order for the geometric elements.

After the reverse pruning ordered model of the object is formed, it may be referenced when the system dynamically creates a new model of the object. The dynamically created new models are typically reduced-complexity models of the object. As an example, a typical plant may include 500,000 leaves, and many copies of the plant may be scattered throughout a scene. Then for a given frame, one copy of the plant may be very close to the viewing plane so that the individual leaves are clearly visible, however another copy of the plant is in the background and the leaves are not clearly visible. In the case of the plant that is close to the viewing plane, the original model of the plant can be used for rendering purposes. However in the case of the plant in the background, a smaller reduced-complexity model of the plant should can be used for rendering purposes. As an example, if a background plant included 500,000 leaves and covered 10×10 pixels (100 total pixels), approximately 5,000 leaves would be rendered per pixel on the viewing plane. The 5,000 values would then be averaged when determining the value of the pixel.

In light of the above, the inventor proposes an technique for loading a subset of the geometric elements in a model of an object where the geometric elements are typically stored in the reverse-pruning order. Based upon this ordered model, at rendering time, only a percentage of the ordered geometric elements may be loaded from the memory to represent the object. In the example above, as few as 1% of the leaves, i.e. 5,000, leaves could be loaded from the ordered model and rendered to represent the plant. In various embodiments, the percentage of geometric elements loaded typically depends upon the screen size of the object in a scene, or the like. For example, if an object is closer to the viewing plane, a larger percentage of the geometric elements should be loaded, and if an object is further away from the viewing plane, a smaller percentage of the geometric elements may be loaded from the ordered model.

In other embodiments, other criteria may be used to determine the percentage of geometric elements to load, such as position of an object in a scene with respect to a camera (e.g. objects in the periphery of a scene or far away from a camera may be represented with fewer geometric elements), the lighting of the object in a scene (e.g. objects in dim lighting may be represented with fewer geometric elements), the position of the object with respect to the depth of field in a scene (e.g. objects appearing out of focus may be represented with fewer geometric elements), volume of the object (e.g. higher volume may imply less transparency, thus more transparent objects may be represented with fewer geometric elements), whether the object is motion blurred in a scene (e.g. objects in motion may be represented with fewer geometric elements), the contrast of the object (e.g. lower contrast objects may be represented with fewer-geometric elements), whether the object is of primary or secondary importance (e.g. background objects may be represented with fewer geometric elements), whether the object is directly viewed or viewed in a reflection or refraction (e.g. an object appearing in a reflection or a refraction may be represented with fewer geometric elements), whether the object is behind a translucent object (e.g. objects viewed through translucent objects (e.g. clouds, glass) may be represented with fewer geometric elements), whether the object is to be input into a simulator or finite element analysis module (e.g. objects for simulation may be represented with fewer geometric elements), and the like.

In one embodiment, the process includes receiving a model of an object including multiple geometric elements. Each geometric element can then be assigned a level of detail (LOD) priority order and then stored as an ordered model of the object. Subsequently, given a determined LOD level, LOD simplification may be applied to the geometric elements in the ordered model. In various embodiments, more aggressive simplification of geometric elements may be applied to geometric elements lower in the priority order, and less aggressive simplification may be applied to geometric elements higher in the priority order.

In various embodiments, more aggressive simplification of geometric element may result in certain geometric elements being geometrically simplified, and/or not being loaded into program memory, or used. Various techniques for switching between different LOD models for an object are contemplated, including fade-in and fade-out of geometric elements. In some embodiments of the present invention, fade-in and/or fade-out effects may be implemented by making geometric elements smaller, thinner, and/or more transparent.

In additional embodiments of the present invention, when only a sub-set of the geometric elements are used to represent the object in a scene, properties of the geometric elements may modified to preserve certain qualities. Such qualities include pixel coverage, projected area, volume, surface contrast, color variance, and the like. In various embodiments, the properties that may be modified include geometric properties, such as width, depth, height, thickness, and the like, surface properties, such as color, contrast, visibility, bump map, displacement map, and the like, and other properties. In various embodiments, properties of other elements in an object, other than the sub-set of the geometric elements, may also be modified because of the reduction in object complexity. For example, the shading parameters or the lighting may be modified to preserve overall contrast of the object.

According to one aspect of the invention, a method for a computer system is described. One technique includes opening a model of an object, wherein the model comprises a plurality of geometric elements, and determining a subset of geometric elements from the plurality of geometric elements of the model. Another process includes retrieving the subset of geometric elements from the plurality of geometric elements of the model, wherein the subset of geometric elements includes a first subset of geometric elements and a second subset of geometric elements, modifying properties of geometric elements from the first subset of geometric elements to form a first modified subset of geometric elements, and using the first modified subset of geometric elements and the second subset of geometric elements to represent a the plurality of geometric elements of the model of the object in the computer system.

According to one aspect of the invention, a computer system is described. One apparatus includes a memory configured to store a geometric model of an object, and configured to store a description of a scene that includes the object, wherein the geometric model includes a specification of geometric elements of the object. Another system includes a processor coupled to the memory, wherein the processor is configured to determine a first subset of geometric elements from the geometric elements in the object to retrieve from the memory, wherein the processor is configured to retrieve the first subset of the geometric elements from the memory, wherein the processor is configured to modify parameters of at least one geometric element from the first subset of geometric elements to form at least one modified geometric element, wherein a second subset of geometric elements from the first subset of geometric elements are not modified, wherein the processor is configured to use only the at least one modified geometric element and the second set of geometric elements as a representation of the object.

According to one aspect of the invention, a computer program product for a computer system including a processor is described. The computer program product may include code that directs the processor to determine a desired level of detail for an object positioned within a scene, code that directs the processor to open a file storing the object, wherein the object comprises a plurality of geometric elements, and code that directs the processor to retrieve a first subset of geometric elements of the plurality of geometric elements from the file until the desired level of detail for the object is reached. Other computer program products may also include code that directs the processor to modify at least one parameter of at least one geometric element from the first subset of geometric elements to form at least one modified geometric element, wherein parameters of a second subset of geometric elements from the first subset of geometric elements are not modified, wherein the at least one modified geometric element and the second subset of geometric elements form a modified subset of geometric elements, and code that directs the processor to provide only the modified subset of geometric elements to a processing module to represent the plurality of geometric elements. The codes typically reside on a tangible media, such as a semiconductor media (e.g. RAM, flash memory), magnetic media (e.g. hard disk, SAN), optical media (e.g. CD, DVD, barcode), or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 14A-F illustrate additional examples according to embodiments of the present invention.

DETAILED DESCRIPTION OF THE INVENTION

Figure 1:
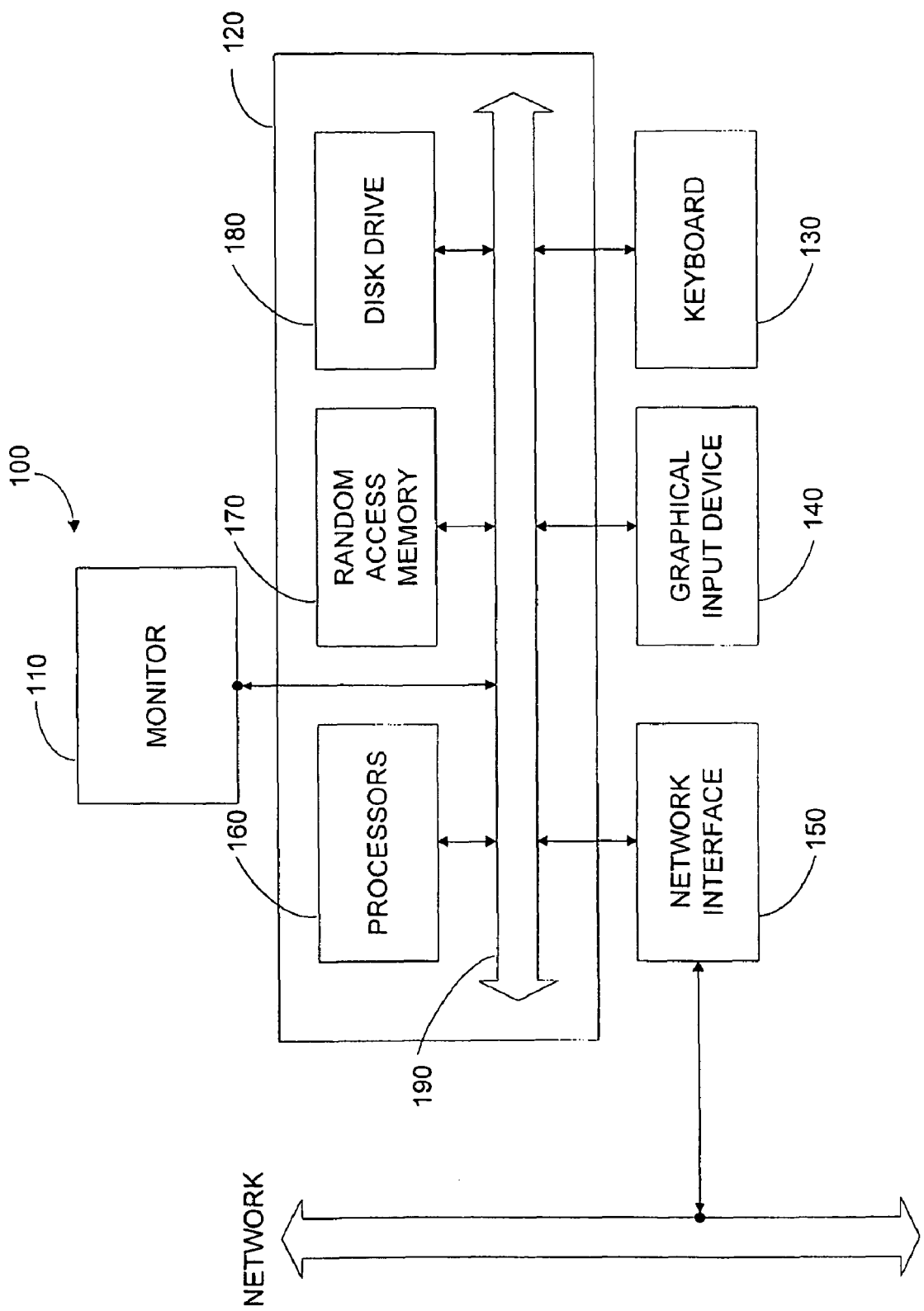
FIG. 1 is a block diagram of typical computer system according to an embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in the present embodiment, computer 120 typically includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Itanium™ microprocessors; Turion™ 64, Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

Figure 2A:
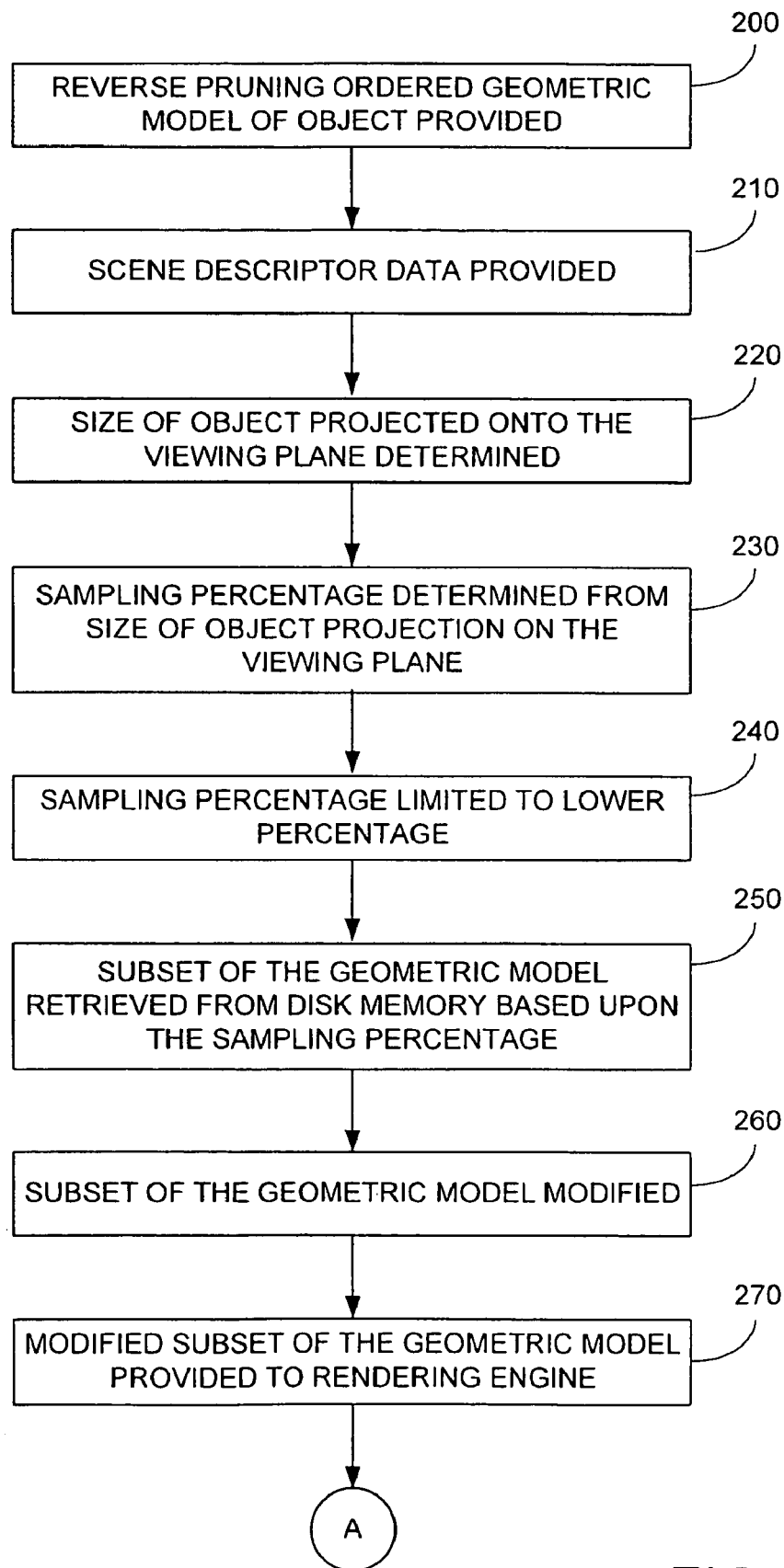
FIGS. 2A and 2B illustrate a block diagram of a process according to one embodiment of the present invention.
Figure 2B:
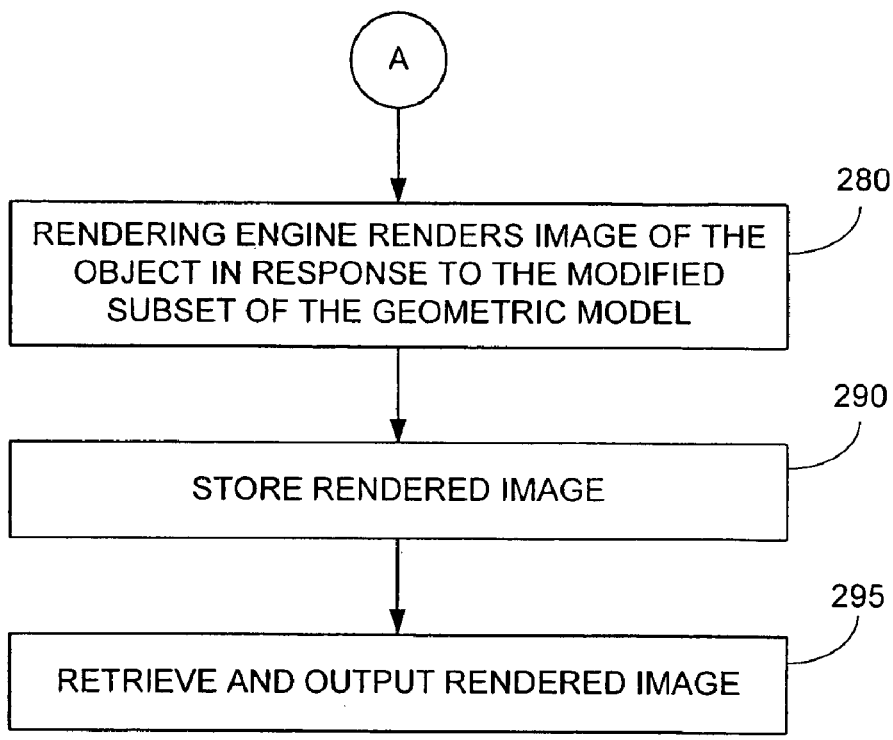

FIG. 2 illustrates a block diagram of a process according to one embodiment of the present invention. More specifically, FIG. 2 provides a high-level illustration of one embodiment.

Initially, a model of an object is provided, step 200. In some embodiments of the present invention, a geometric model of the object may be specified by a user, e.g. a modeler, using conventional object creation software tools. In various embodiments, the geometric model may be procedurally defined or include procedurally defined elements. For example, procedurally defined models are useful when creating an object with many similar geometric elements. For example, for a tree with 500,000 leaves, or for a character with 2 million strands of hair, or the like, the specification of each leaf or each strands of hair can be performed procedurally. In some embodiments of the present invention, the original geometric model may be specified by using any conventional representation scheme, such as Nonuniform Rational B-Splines (NURBS), and the like. The geometric elements of the object in the model are then ordered according to a reverse pruning order method and/or stored in a reverse pruning ordered (RPO) geometric model, discussed further below. In some embodiments of the present invention, the geometric elements of an object may be ordered or partially ordered manually within the storage.

In some embodiments of the present invention, a "scene" specifying the position of the object is also provided, step 210. In various embodiments, a scene may be specified using conventional three-dimensional scene creation tools such as Maya, or the like. In other embodiments, animation environments, such as Pixar's internal Menv software is used to specify the position, orientation, etc. of objects in a scene. In some embodiments of the present invention, the scene descriptor file includes the original geometric model. In other embodiments, the scene descriptor file refers to the original geometric object by file name, pointer, memory structure, or the like.

In some embodiments of the present invention, based upon the position of the object, an approximate size of the object is determined relative to a "viewing" or imaging plane, step 220. For example, a plant may be positioned in the "background" of a scene, and be projected to or represented by 400 pixels on the viewing plane. As another example, the plant may be positioned in the "foreground" of a scene, and cover 10,000 pixels on the viewing plane In some embodiments of the present invention, the number of pixels can vary.

In alternative embodiments of the present invention, the scene descriptor file includes a bounding volume (e.g. a bounding box) associated with the object. Based upon this bounding volume, and the object positioning data in the scene descriptor file, the approximate size of the object relative to the viewing plane is determined.

In various embodiments, a sampling ratio or percentage (or loading indicia) is then determined, step 230. In the present embodiment, the sampling ratio is used to determine how many of the geometric elements to load from an RPO geometric model of an object into memory. This sampling percentage may be specified by a user and/or may have a default value. In examples, a sampling ratio or percentage has a default value ranging from 5%-10%; 40%-60%, 10%-85%; and the like. In other embodiments, a target number of elements per pixel may be specified, and the sampling ratio or percentage determined from that. For example, if the target is 100 elements per pixel, and the object has 1000 elements per pixel on the screen, then the sampling percentage would be 10%. In other embodiments, the loading indicia may alternatively represent the number or percentage of geometric elements to prune from an RPO geometric model of an object.

In additional embodiments, other criteria of the object in the scene may be used alternatively, or in combination, for determining a sampling ratio or percentage in step 230 above. As an example, "Importance" of the object may be considered. For example, a main character may be considered more "important" than a prop in a scene, thus the sampling percentage of the main character may be higher than the prop, although the prop may occupy a greater portion of the scene. As another example, the "brightness" of the object in the scene may be considered. For example, for identical placements in a scene, at nighttime, a sampling percentage of an object may be smaller than the sampling percentage of the object in the scene at daytime. Other types of criteria are also contemplated, such as: the position of the object within the image frame (e.g. objects in the center of the image versus the edges of the image), whether the object is in motion (e.g. objects in motion versus stationary objects), whether the object is within the depth of field, i.e. focused (e.g. whether the objects are within the depth of field or not), whether the objects have high contrast surfaces, whether the objects are behind other translucent objects, whether the objects are to be directly viewed or viewed in a reflection. The inventor of the present inventions believe that one of ordinary skill in the art will recognize that in light of the present patent disclosure, many other criteria may be used in embodiments of the present invention.

In some embodiments of the present invention, limitations may be placed on the sampling percentage, step 240. For example, a lower limitation (e.g. 50 geometric elements per pixel) may be used, such a pixel in the viewing plane is represented by no fewer than 50 geometric elements for that object. Continuing the example above, if 10,000 geometric elements identified from an object were to be represented on the viewing plane with 100 pixels, this would correspond to 100 geometric elements per pixel. This would be within the 50 element per pixel limitation above. However, if 10,000 geometric elements were to be represented on the viewing plane with 1000 pixels, this would correspond to 10 geometric elements per pixel. This case would not be within the 50 geometric elements per pixel limitation, accordingly, the sampling ratio in step 230 would have to be redetermined, or set to 100%. In embodiments of the present invention, step 240 considerations may also be included within step 230.

In other embodiments of the present invention, the sampling percentage determined in step 230 and restricted in step 240 is determined in response to the lower sampling limitation (e.g. X geometric elements per pixel.) More particularly, in one embodiment, given the lower sampling limitation, (e.g. X geometric elements per pixel), the number of pixels in step 240 and the number of geometric elements in the object, the percentage in step 230 may be determined, and step 240 may be skipped. As an example, with a lower sampling limitation of 50 geometric elements per pixel, a tree with 500,000 geometric elements, and the tree covering 400 pixels, the sampling percentage is determined to be approximately 4%. That is, as few as 4% of the 500,000 geometric elements (20,000 geometric elements) can be loaded from memory and/or used for rendering the 400 pixels, to satisfy the 50 element per pixel requirement (20,000/400=50). In other embodiments, the lower sampling limitation (elements per pixel) may be set to any other value desired.

Next, in response to the sampling percentage, the RPO geometric model is opened, and the sampling percentage of geometric elements is read-out from the model and loaded into program memory, step 250. Conversely, in various embodiments, the remaining percentage of the geometric elements are not loaded into memory, thus fewer disk accesses are required, and the program memory is less full. In various embodiments, the loading indicia may specify a target number of geometric elements from the model, directly.

In the present embodiment, the geometric elements within the sampling percentage are then modified, step 260. Details regarding embodiments of this process are described below.

In various embodiments, the modified geometric elements ("modified geometric model") are then provided to the rendering engine, with or without other elements in the scene, for rendering purposes, step 270. In response to the geometric model of the object, the rendering engine determines a two-dimensional representation of the object directly or indirectly (e.g. via one or more reflections or refractions) at the viewing plane, step 280.

In some embodiments of the present invention, the rendering engine refers to a high quality rendering process provided by rendering engines such as Pixar's Renderman® rendering software. In other embodiments of the present invention, other rendering engines can advantageously utilize the techniques described herein including MentalRay by MentalImages, or the like. In still other embodiments, lower quality hardware engines (e.g. graphics processor units (GPU) and software rendering engines (e.g. OpenGL) can also advantageously incorporate the techniques describe herein.

In the present embodiments, after the two-dimensional representation (image) of the modified geometric model on the viewing plane is determined, a representation of the image is stored, step 290. In one example, a rendered image including the object in the scene is stored to a hard disk, optical disk, semiconductor memory, film media, or the like. Subsequently, the rendered image may be retrieved and displayed to the user, or other user, step 295. For example, the image may be stored on a DVD and played to a home entertainment system, the image may be stored on a hard disk and displayed to an audience, the image may be printed, or the like. In other embodiments, in step 290, the image is buffered in a display memory, and in step 295, the image is output to a user on the display. In such embodiments, the image may or may not be transferred into non-volatile memory.

In other embodiments of the present invention, the dynamically determined object model need not be determined directly for rendering purposes, as discussed in steps 270-295, above. In other embodiments, the modified geometric elements determined in step 260 may be sent to specific application (hardware or software) modules such as: for determining shadow maps, for determining deep shadow maps, for determining thickness maps, for determining subsurface scattering effects, for baking applications, for input to simulation programs, for input to finite element analyses, for radiosity computations, and the like. The inventor of the present invention believes that in light of the present disclosure, one of ordinary skill in the art may envision additional applications for embodiments of the present invention.

Various embodiments of the present invention illustrate different examples of pruning order. Generally, in various embodiments, the farther away an object is from the viewer or view plane, the smaller it is on the screen. Because the object is smaller, there are more geometric elements contributing to values of each pixel, thus more geometric elements can be pruned. In various embodiments, u is defined as a fraction of the geometric elements that are unpruned, as a function of z, the distance from the camera. There are many ways for defining such a function. In some embodiments, since the number of elements per pixel is proportional to $z^{-2}$, the following relationship may be defined for u:

$$u = z^{-\log h2}$$

Figure 13A:
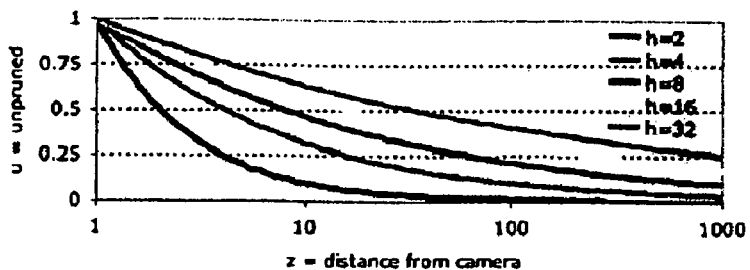
FIGS. 13A-D illustrate additional examples according to embodiments of the present invention.

In this equation, h is the distance at which half the elements are pruned. As illustrated in FIG. 13A, this controls how aggressively elements are pruned as they get smaller. In FIG. 13A, note that for simplicity the graphs are scaled such that z=1 where pruning begins; this should be where the shapes of individual elements are no longer discernible, usually when they are about the size of a pixel. As a result, this z scaling will depend on the image resolution.

In various embodiments, the geometric elements should be pruned in a consistent order. It is typically not desired that pruning be correlated with geometric position, size, orientation, color, or other characteristics (e.g., pruning elements from left to right would be objectionable). Some objects are constructed in such a way that the pruning order can be determined procedurally, however, in many embodiments, a more general and useful pruning order is determine stochastically. As will be described further below, in some embodiments, a simple technique is to assign a random number to each element, then sort the elements by their random numbers. This is usually sufficient in practice, however, in some embodiments it is also desirable to ensure that pruning is spread over the object, by pruning elements that are not geometrically close to each other in the pruning order. Such embodiments allows more aggressive pruning of object.

In some embodiments of the present invention, when n, the number of elements in the object, is large, the time spent loading n elements from memory and trivially rejecting some of the elements can be significant. Accordingly, in some embodiments, it is desirable to avoid loading elements that are not to be displayed. One method to facilitate this is by storing the elements in an "ordered" file in reverse pruning order so that only the first N elements need to be read from the file at rendering time. This "ordered" file can be created as a post-process step with a model of an object. Various embodiments have been proven to work especially well in a film production environment, where many randomly scaled and rotated versions of a small number of pre-built objects are used in a scene, e.g. plant shapes.

Figure 3:
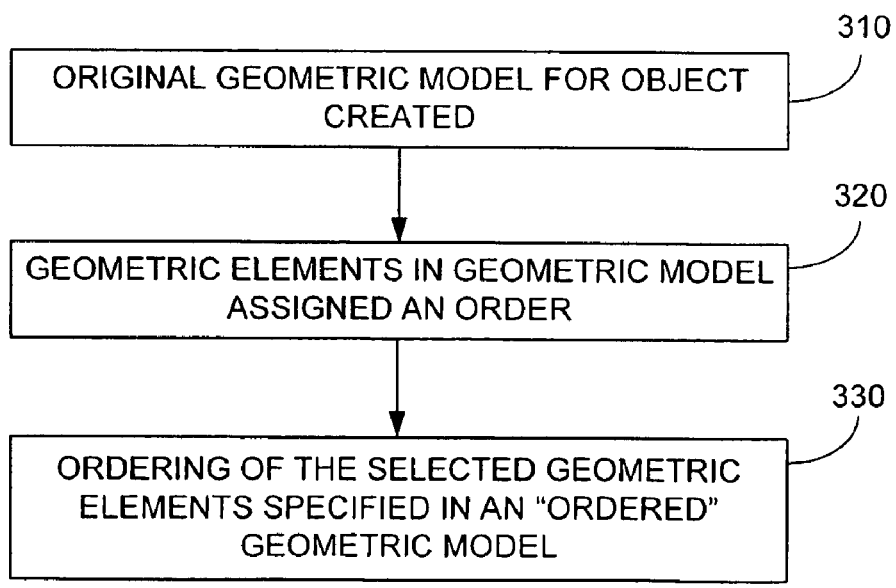
FIG. 3 illustrates a flow diagram according to an embodiment of the present invention.

FIG. 3 illustrates a flow diagram according to an embodiment of the present invention. More particularly, FIG. 3 illustrates the process of forming a reverse pruning ordered (RPO) geometric model.

Initially, an initial geometric model for an object is provided, step 310. As described above, the initial geometric model of the object may be specified by a user using object creation software tools, generated by using a procedural software module, or the like. Additionally, the initial geometric model may be pre-processed by other applications and for other purposes. In some embodiments of the present invention, a typical object will have a great number of repetitive geometric elements, such as hair, leaves, atmospheric effects, and the like. The repetitive geometric elements may also have unique properties, such as shape, size, color, and the like.

With embodiments of the present invention, the repetitive geometric elements are typically not initially stored in a reverse pruning order in one or more files. As examples, the order of the geometric elements may be stored in the file in the order in which they were created, in an animation node order, in a geometric node order, or the like. Accordingly, the order of the geometric elements as they are created and stored in one or more files is typically not as useful for embodiments of the present invention.

Next, in the present embodiments, a reverse pruning order for the geometric elements for the object is determined, step 320. In the present embodiment, based upon the reverse pruning order, the geometric elements for the object are stored in that order in an RPO geometric model, step 330. More specifically, geometric elements that are less aggressively pruned and to be retrieved earlier in time are placed before geometric elements that are more aggressively pruned and to be retrieved later in time, if at all, within the file. The ordering of the geometric elements in the file is also associated with increasing a level of detail for the object.

Different methods for determining the above steps are contemplated, including using a deterministic technique, random sampling, stochastic sampling, Poisson sampling, Poisson-disk sampling, pseudo-random sampling, and the like. As an example, a deterministic technique may include functions where geometric elements meeting a minimum criteria are selected (e.g. any geometric element greater than X distance away from a particular element), functions where geometric elements meeting a maximum criteria are selected (e.g. the geometric element furthest away from a particular element), and the like. Further details regarding specific methods are discussed below.

As merely an example of the above, a random number is associated to the repetitive geometric elements in the object in step 320. Next, in step 330, the geometric elements are stored according to the order of the associated random number.

With embodiments of the present invention, when only a percentage of the geometric elements for an object are to be rendered, as discussed in FIG. 2, typically only that percentage of the geometric elements are read from the RPO geometric model. The remaining geometric elements, in this example, are not needed for rendering, thus these geometric elements are not loaded from disk into program memory. Accordingly, when rendering the object, fewer disk memory transfers are required, and the rendering process is accelerated.

Figure 4A:
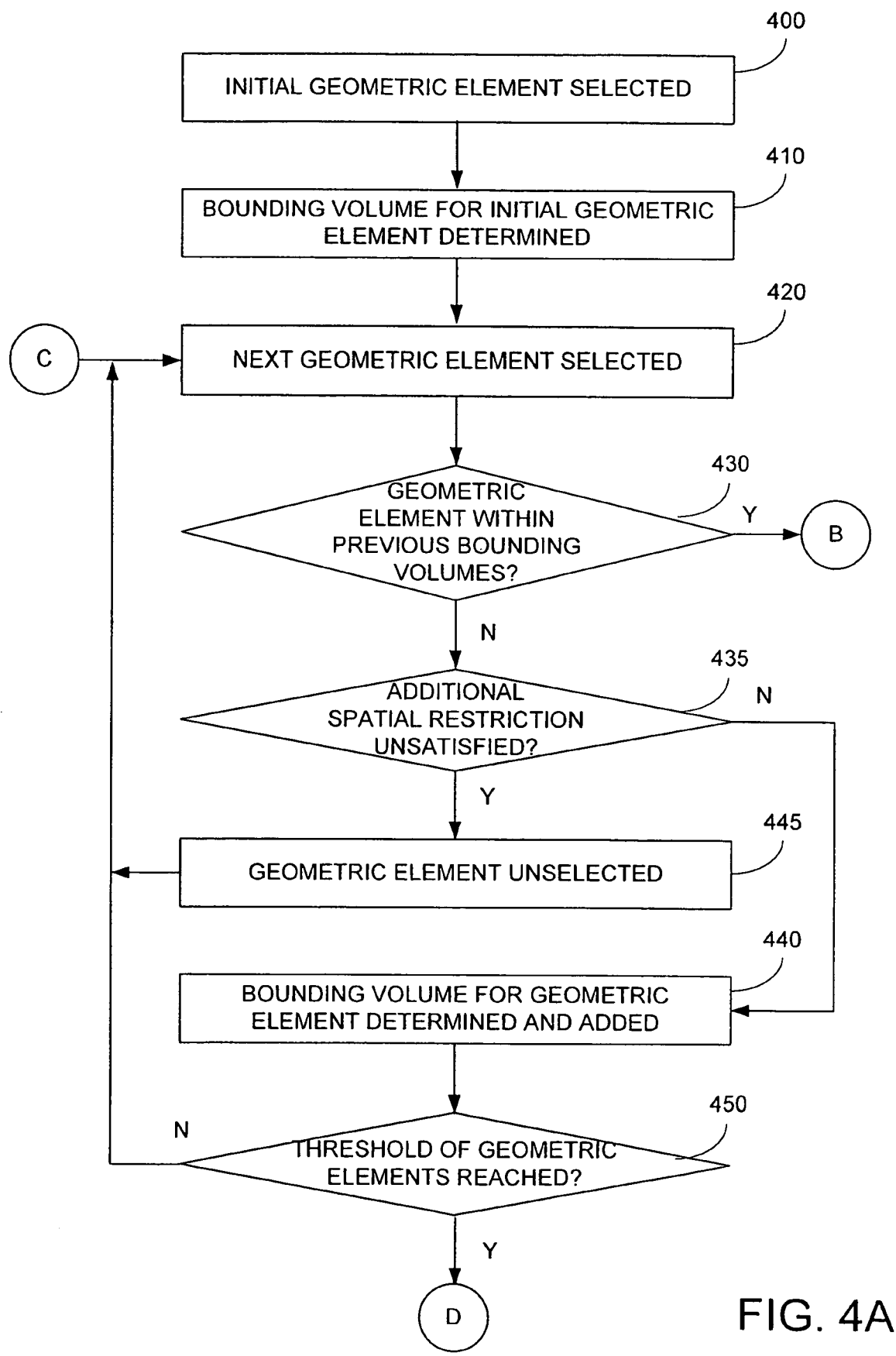
FIGS. 4A-B. illustrate a flow diagram according to an embodiment of the present invention.
Figure 4B:
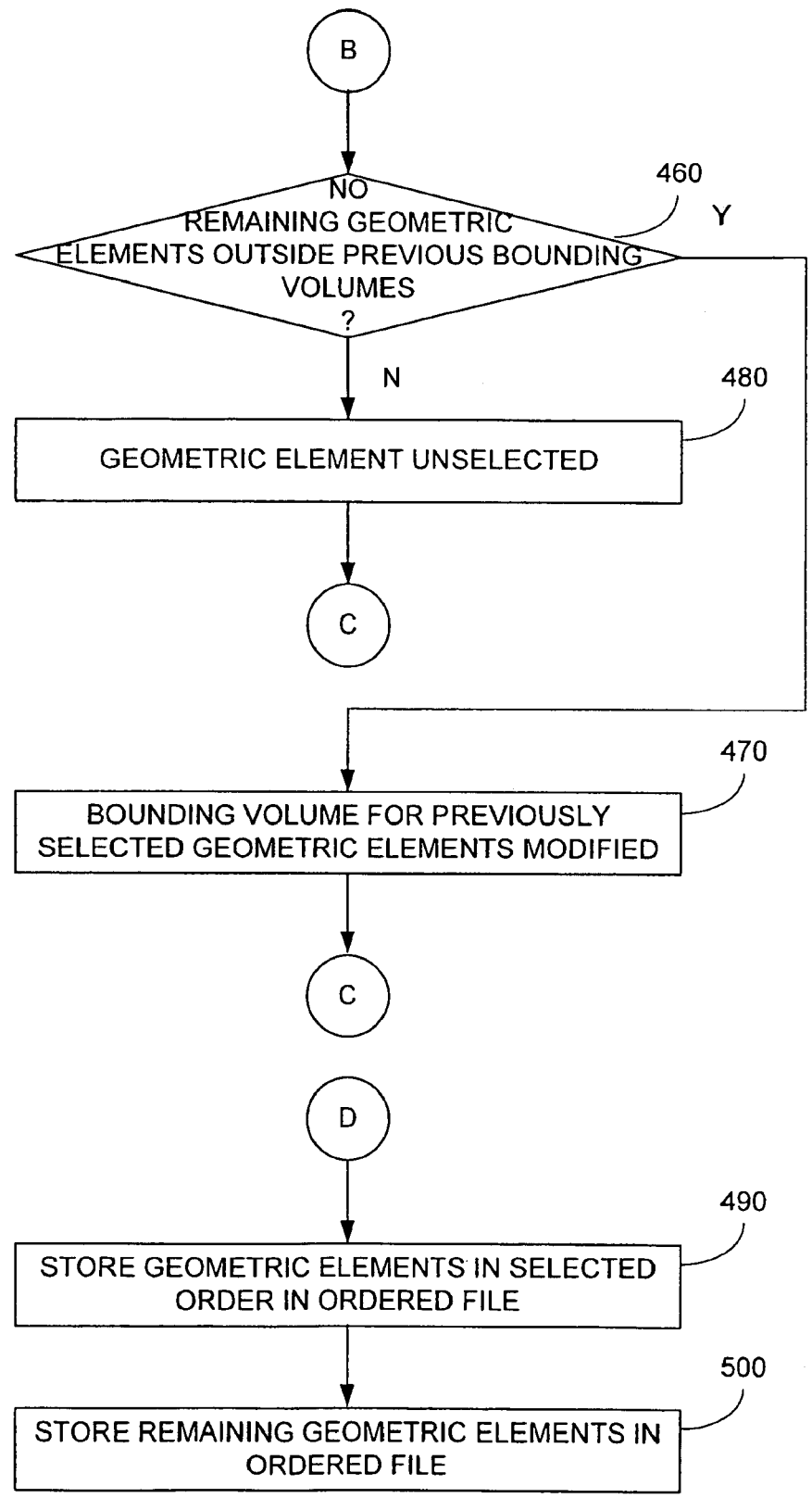

FIGS. 4A-B. illustrate a flow diagram according to an embodiment of the present invention. More particularly, FIGS. 4A-B illustrate a process for determining a reverse pruning order for the geometric elements for the object.

Initially, a first of the repetitive geometric elements of the object is selected, step 400. In some embodiments of the present invention, the first geometric element may be pre-determined, random, selected to fulfill certain criteria (e.g. near the center of the object), or the like.

Next, a bounding volume is determined around the first geometric element, step 410. In some embodiments of the present invention, the size of the bounding volume may vary. In one system, the bounding volume (e.g. bounding box) is selected as $\frac{1}{4}$, $\frac{1}{8}$, $\frac{1}{27}$, $\frac{1}{64}$, $\frac{1}{256}$ or the like, of the volume of a bounding volume of the entire object. In other embodiments, embodiments, other type of bounding volumes can be used, such as a bounding sphere, or the like.

In the next step, another geometric element is selected, step 420. In various embodiments, this geometric element may also be randomly selected. In the present embodiments, a determination is made if the geometric element is not within the bounding volumes of previously selected geometric elements, step 430.

In some embodiments of the present invention, the spatial restriction on a selected geometric element for the previously selected geometric elements may be combined with another spatial restriction based upon the order of previously selected geometric elements in the reverse pruning order, step 435. A more detailed discussion is given in conjunction with FIGS. 5A-B, below. In various embodiments, if the geometric element is within a bounding volume of specific previously selected geometric elements in the reverse pruning order, the geometric element is unselected, step 445. The bounding volume may vary from that used in step 410. In other embodiments, steps 435 and 445 may be eliminated.

Next, a bounding volume is determined around this geometric element, step 440. In various embodiments, the size of the bounding volume may be the same as bounding volumes of other selected objects, or different.

In some embodiments of the present invention, the process above then repeats, until a threshold percentage of geometric elements have been selected, step 450. In various embodiments, all repetitive geometric elements of an object are selected using this technique. In other embodiments, from 40% to 60% of the geometric elements are selected using the process described above. In such cases, the remaining geometric elements remain un-selected, and un-ordered. In other embodiments, the threshold level may vary from 30% to 70%, 25% to 75%, or the like.

In some embodiments, if the geometric element is within the bounding volumes of previously selected geometric elements, a test is performed to determine if any geometric elements are outside bounding volumes associated with previously selected geometric objects, step 460. In other words, what is determined is whether there are any-unordered geometric elements what would satisfy the criteria for being added to the reverse pruning order list.

In some embodiments of the present invention, if the threshold is met, the sizes of the bounding volumes of previously selected geometric elements are adjusted, step 470. As an example, the size of the bounding volumes may be halved. In other examples, the volume may be reduced from $\frac{1}{4}$ to $\frac{1}{8}$, from $\frac{1}{8}$ to $\frac{1}{27}$, from $\frac{1}{64}$ to $\frac{1}{256}$, or the like. In various embodiments, the lower-end size of the bounding volume may be limited. Further, in other embodiments, different methods for reducing the bounding volumes may be used.

If the threshold is not met, there are "better" selections for the geometric element available. Accordingly, the selected geometric element is un-selected, step 480. Subsequently, the process described above is repeated.

In some embodiments of the present, according to the process described in FIG. 3 above, the selected geometric elements for the object may be stored in the object file in the order they were selected, step 490. In other embodiments, the selected geometric elements may be stored in the file in any other order and a pointer table, or the like may specify the order. In the case where there are geometric objects remaining that were not selected, the selected geometric objects may be stored near the beginning of the file. Next, the remaining geometric objects may be stored in the file in any order, step 500. As examples, they may be stored in the order they appear in the original object file, in random order, or the like. In various embodiments, the non-selected geometric objects are stored near the end of the file. In various embodiments, by storing the selected geometric objects at the beginning of the file, the time for accessing these geometric objects for rendering purposes, or the like, is reduced.

Figure 5A:
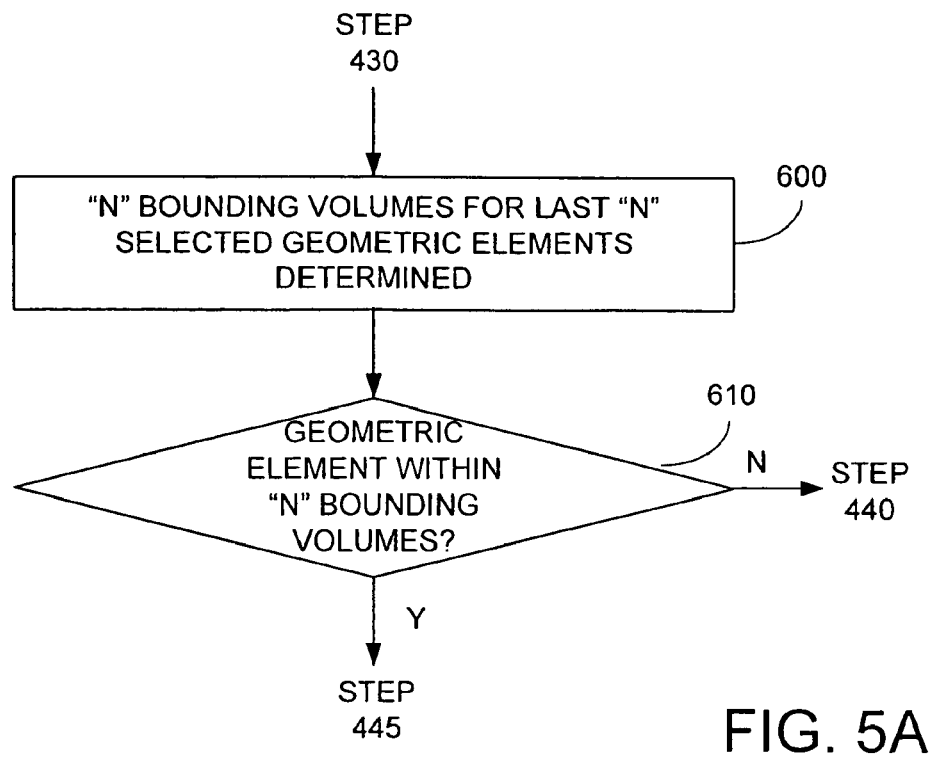
FIGS. 5A-B illustrate flow diagrams according to embodiments of the present invention.
Figure 5B:
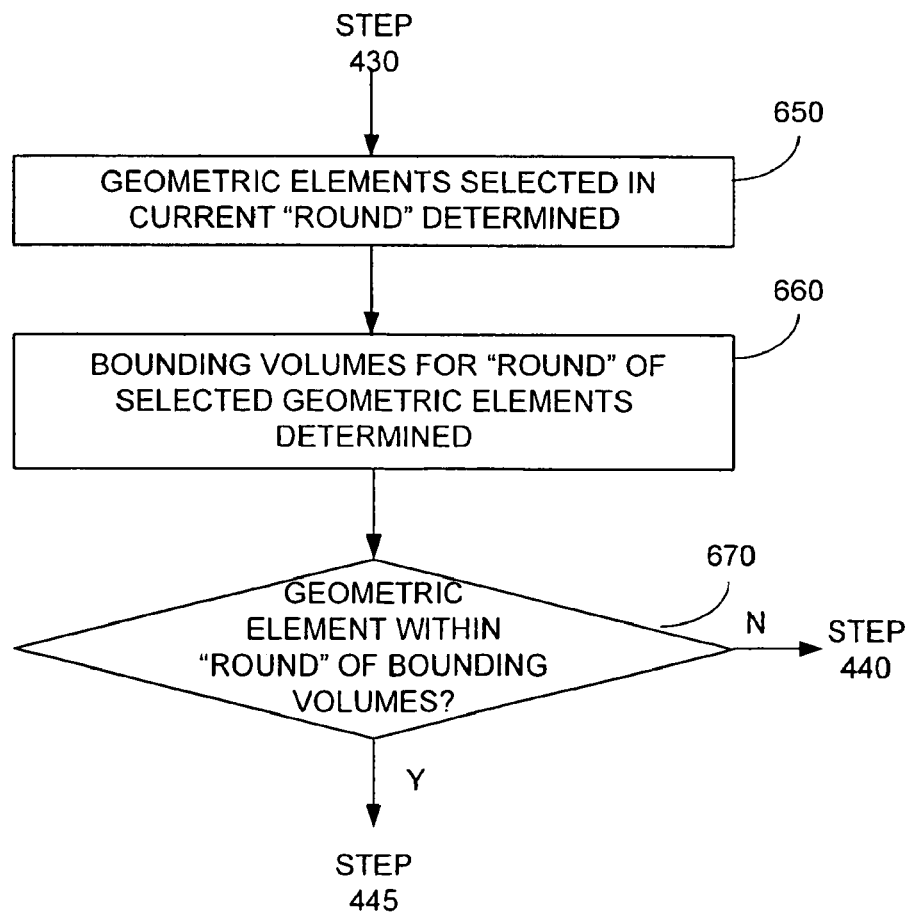

FIGS. 5A-B illustrate flow diagrams according to embodiments of the present invention. More particularly, FIGS. 5A-B illustrate spatial restrictions on selection of a geometric element based upon the order of geometric elements in the reverse pruning order, see step 445 in FIGS. 4A-B.

In one embodiment illustrated, in FIG. 5A, bounding volumes for the last "N" number of selected geometric elements in the reverse pruning order are determined, step 600. In various embodiments, the bounding volume used for each of the last "N" geometric elements are the same. For example, each of the last "N" geometric elements is associated with a bounding volume that is 1/27th, 1/64th, 1/256th, and the like of the volume of the entire object bounding volume. In other embodiments, the bounding volumes used for the last "N" geometric elements are different, based upon the order. For example, the N−2th geometric element may have an associated bounding volume of 1/256th the volume of the entire object bounding volume, the N−1th geometric element may have an associated bounding volume of 1/64th the volume of the entire object bounding volume, the Nth geometric element may have an associated bounding volume of 1/27th the volume of the entire object bounding volume, and the like. In various embodiment, the rate the bounding volume shrinks may be a sharp drop, a linear drop, an exponential drop, a $1/r^2$ drop, or the like.

Additionally, in various embodiments, the number "N" is typically inversely related to the size of a fixed-size bounding volume. For example, when the "N" is smaller, the size of the bounding volume may be larger; and when "N" is larger, the size of the bounding volume is generally smaller. As examples of this embodiment, if the bounding volume is $1/64^{th}$ the size, the number N is may be equal to 65 or less, 48 or less, 32 or less, or the like; if the bounding volume is $1/125^{th}$ the size, the number N may be equal to 124 or less, 100 or less, 63 or less, and the like.

Next, the location of the currently selected geometric element is compared to the bounding volumes for the last "N" number of selected geometric elements, step 610. If the currently selected geometric element is within these bounding volumes, the geometric element is unselected in step 445. Otherwise, the process continues to step 440.

In the embodiment in FIG. 5B, a number of selected geometric elements are determined, step 650. In contrast to above, the number of selected geometric elements is determined by the number of geometric elements selected in this "round." In some embodiments of the present invention, a "round" may be geometric elements that are compared to a common bounding volume size. For example, geometric elements selected when a bounding volume in FIG. 4 is $1/64^{th}$ the size of the bounding volume of the object; when the bounding volume is 1/256th the size, or the like.

In the present example, bounding volumes are generated for the selected geometric element in this round, step 660. In some embodiments, the bounding volume of the geometric elements in this round need not change in size. As examples, the bounding volume may be $1/27^{th}$, $1/64^{th}$, $1/256^{th}$, or the like the volume of the bounding volume for the entire object. In some embodiments, the bounding volumes of geometric elements selected in different rounds may depend upon the distance between the current round and previous rounds. For example, the restricted area (bounding volume) of geometric elements may shrink the further the rounds are apart. In various embodiment, the rate the bounding volume shrinks may be a sharp drop, a linear drop, an exponential drop, a $1/r^2$ drop, or the like.

As above, the location of the currently selected geometric element is compared to the bounding volumes for the selected geometric elements, in this round, step 670. If the currently selected geometric element is within these bounding volumes, the geometric element is unselected in step 445. Otherwise, the process continues to step 440.

An simplified example of pseudo code that may implement the embodiment in FIG. 5B is as follows:

```
rsa = ¼   // spatial_restriction_size "a"
"pruned" list and "currently_pruning" list are empty
all leaves are on the "unpruned" list
while the "unpruned" list is not empty
   for each leaf on the "unpruned"
      if leaf is >rsa to any leaf on "pruned" list and
      to any leaf on "currently pruning" list
         move leaf to "currently pruning" list
   if "currently pruning" list is not empty
      move all leaves on that list to the "pruned" list
      this leaves the "currently pruning" list empty
   otherwise
      rsa = rsa/2
```

Additional embodiments of the present invention do not necessarily use bounding volumes, as illustrated in steps 600 and 610 or 660 and 670. Instead, in some embodiments, the criteria for determining whether a selected geometric element is unselected or added to the reverse pruning order list is based upon a "distance" function. As an example, the selected geometric element may be added to the reverse pruning order only if it is the far away from or the farthest distance away from previously selected geometric elements. In the case N=1, distances between the unselected geometric elements and the last geometric element placed in the reverse pruning order list would have to be computed, and the geometric element furthest away from the last geometric element would be added to the reverse pruning order list. In the case N>1, the distances between the unselected geometric elements and the last N geometric elements placed in the reverse pruning order list would be computed and possibly combined. Many types of combinations are contemplated, such as summation, squared distances, square roots of distances, and the like. In some embodiments, the geometric element with the highest combination value may be added to the reverse pruning order list.

In another embodiment, the criteria for determining whether a current geometric element is unselected or added to the reverse pruning order list is based upon probability functions. Generally, in such embodiments, probability fields are determined around the last N or all of the geometric elements in the reverse pruning order list. Next, based upon the position of the currently selected geometric element compared to the last N or all of the listed geometric elements, a net probability is computed. Next, based upon that net probability, the currently selected geometric element is either rejected or added to the reverse pruning order list. As examples, in a case where a selected geometric element is within a 50% acceptance probability field of one listed geometric element, the probability of adding the geometric element to the list is 50%; in a case where a selected geometric element is within probability fields of two listed geometric elements (e.g. 40%, 25%), the probability of adding the geometric element to the list is determined by multiplying the probabilities (e.g. 10%); in a case where a selected geometric element is not within any probability fields, the default acceptance probability may be 100%. In other embodiments, the default acceptance probability may be specified to be less than 100%.

In some embodiments of the present invention, the probability fields may be the same size or different and have the same acceptance probabilities. In other embodiments, the probabilities may vary according to how recently the geometric element was added to the reverse pruning order list. For example, recently added geometric elements should have lower probability values compared to less recently added geometric elements. For instance, the first most recent geometric element may have a 10% probability field, the second most recent geometric element may have a 20% probability field, the third most recent geometric element may have a 25% probability field, the Nth geometric element may have a 50% probability field, and the like.

As can be determined, using a probability field is different from the strict bounding volume tests illustrated in FIGS. 5A-B. For example, having two consecutive and adjacent geometric elements in the reverse pruning order list is not possible using the bounding volume embodiments, however is theoretically possible (e.g. 0.1% probability) when using the probability-based embodiments described above.

Figure 6A:
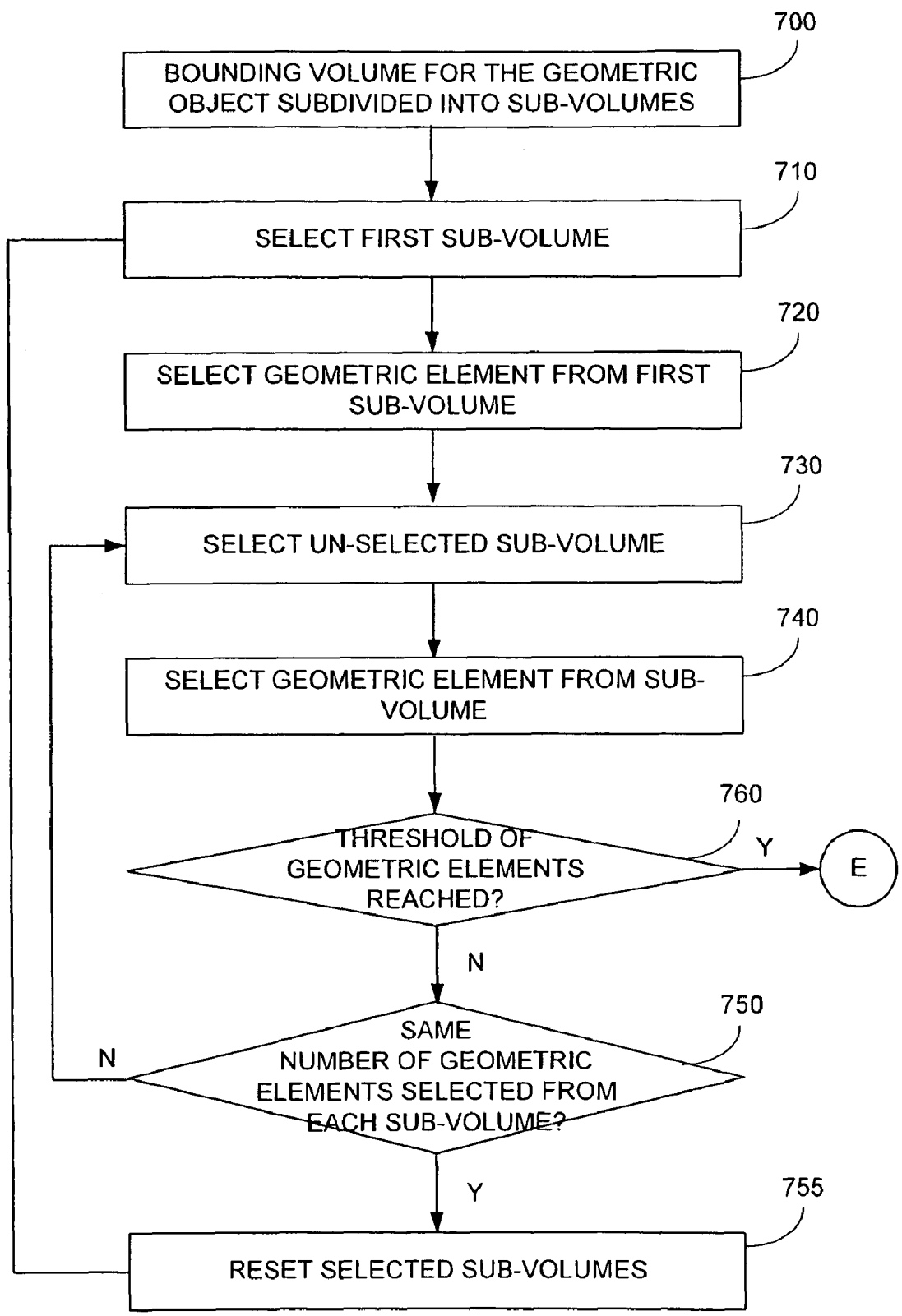
FIGS. 6A-B illustrate a flow diagram according to an embodiment of the present invention.
Figure 6B:
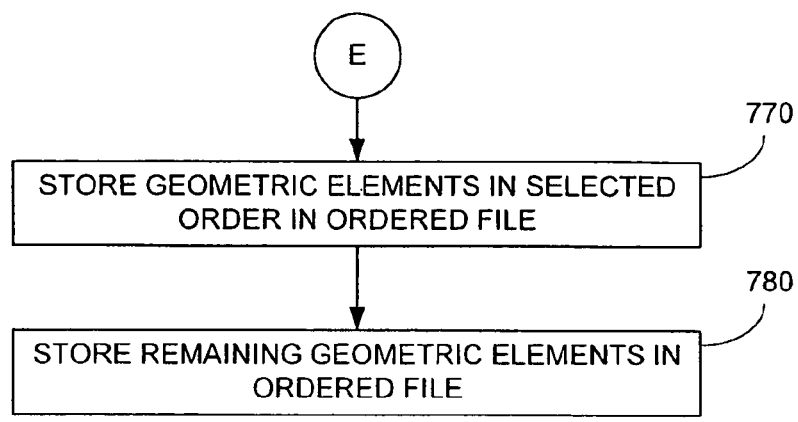

FIGS. 6A-B illustrate a flow diagram according to an embodiment of the present invention. More particularly, FIGS. 6A-B illustrate another process for determining an ordering for the geometric elements for the object. In various embodiments, the jittered sampling, stochastic sampling techniques disclosed in U.S. Pat. No. 4,897,806 may be adapted for selection of the geometric elements.

Initially, the bounding volume of the geometric object is divided into a series of subvolumes (e.g. cubes, three-dimensional rectangles, and the like), step 700. As an example, the bounding volume of the object may be divided into eight cube units per side thus the object may be divided into 512 cubes. In some embodiments of the present invention, cubes that do not contain geometric elements may be discarded, leaving only cubes that include geometric elements.

In other embodiments, the geometric object may be divided into subvolumes. Further, the subvolumes need not be the same size or same shape. In one embodiment, what is desired is that the number of geometric elements in each smaller volume be approximately the same (e.g. within 25%, 10%, or less). For example, for a swarm of bees, the subvolumes may be larger on the edges of the swarm, and smaller near the center of the swarm. In such an example, the density of bees would be more similar.

Next, one of the subvolumes are selected, step 710. In some embodiments of the present invention, any conventional method for selecting the smaller volume from the series of subvolumes may be used, such as a pseudo-random selection, such as in order within the grid (e.g. left-to-right, front-to-back, top-to-bottom, or the like), or the like.

In the present embodiments, a geometric element is selected from the smaller volume, step 720. In some embodiments of the present invention, any conventional method for selecting may be used, such as a pseudo-random selection, or the like.

Next, in the present embodiments, another one of the subvolumes is selected that has not been previously selected, step 730. Again, any conventional method for selecting the smaller volume from the series of subvolumes may be used, such as a pseudo-random selection, in order within the grid (e.g. left-to-right, front-to-back, top-to-bottom, or the like). In one embodiment, it is desired that the selected smaller volume not be close in space to any subvolumes that have been previously selected, if possible. Examples of techniques for implementing this concept will be given, below.

In the present embodiments, a geometric element is then selected from the selected smaller volume, step 740. Again, any conventional method for selecting may be used, such as a pseudo-random selection, or the like.

In the present embodiment, a determination is made if a threshold number of geometric elements have been selected, step 760. As discussed in FIGS. 4A-B above, the threshold may be set to any desired percentage such as 40%, 50%, 75%, 100%, or the like.

In FIGS. 6A-B, if approximately the same number of geometric elements have been selected from each of the subvolumes, step 750, the list of selected subvolumes is reset, step 755, and the process above repeats. For example, one geometric element is selected from each smaller volume, before a second geometric element is selected from each smaller volume, etc.

In the present embodiments, once the threshold number of geometric elements have been selected, the selected geometric elements may be written to the object file, as discussed above, step 770, and the remaining geometric elements are then written to the object file, step 780.

In various embodiment, a temporal restriction may also be incorporated into the spatial restrictions disclosed above. In some embodiments, the temporal restrictions discussed in FIGS. 5A-B, may also be used.

Figure 7A:
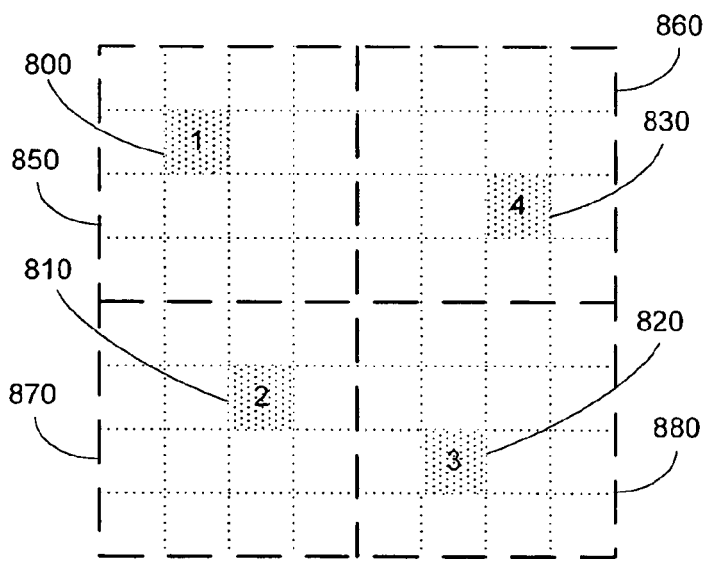
FIGS. 7A-C illustrate examples according to embodiments of the present invention.
Figure 7B:
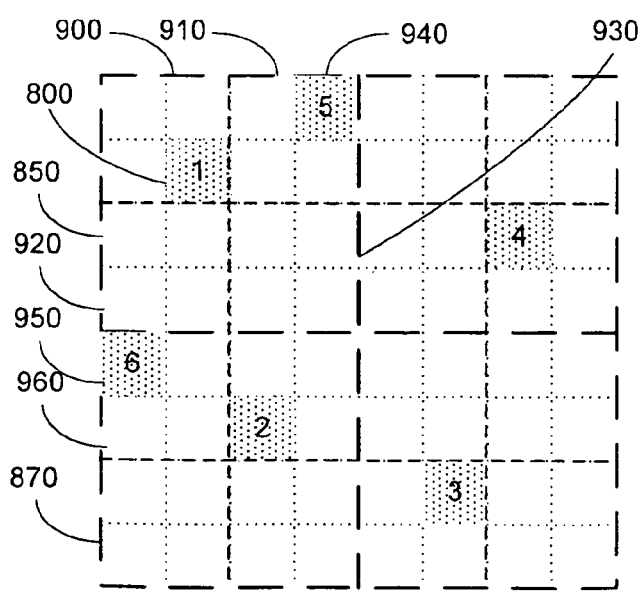
Figure 7C:
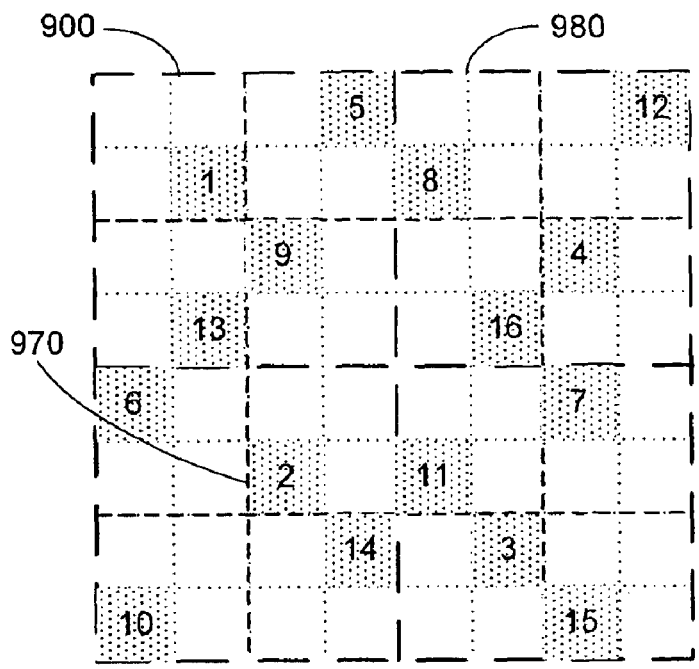

FIGS. 7A-C illustrate examples according to embodiments of the present invention. More specifically, FIGS. 7A-C illustrate two-dimensional examples of a process discussed in FIGS. 6A-B. As discussed above, in various embodiments, it may be desirable that the subvolumes that are selected are not close to previously selected subvolumes.

FIG. 7A illustrates a two-dimensional representation of a number of subvolumes 800, 810, 820, and 830, of a bounding box 840 for an object. Also shown are a series of "super cubes" 850, 860, 870, and 880. In the present example, smaller volume 800 is selected in step 710. Then according to this example, a small volume selected in step 730 cannot be from the same super cube 850. Thus as shown, smaller volume 810 is selected from super cube 870. Similarly, a small volume selected in step 730 during the next iteration cannot be selected from super cubes 850 or 870. Thus as shown, smaller volume 820 is selected from super cube 880. Finally, small volume 830 is selected from super cube 860.

In three-dimensional space, in this example, eight supercubes would be provided, thus, the smaller cubes need not be within the same two-dimensional plane, as illustrated above.

In FIG. 7B, after subvolumes have been selected from each super cube, a series of sub-supercubes are used to restrict how close in space the subvolumes may be selected. As shown, a series of sub-supercubes 900, 910, 920, 930 are shown. In this example, a fifth smaller volume 940 is selected from sub-supercube 910, which is a different sub-supercube than sub-supercube 900 within supercube 850. Further, a sixth smaller volume 950 is selected from sub-supercube 960, which is a different sub-supercube than sub-supercube 970 in supercube 870.

This process repeats, as illustrated, until a second smaller volume has been selected from each supercube.

FIG. 7C illustrates an example where several more rounds of selections of subvolumes have been performed. In the present example, after FIG. 7C, subvolumes are selected from each of the sub-supercubes, again preferably from different supercubes. The same methods discussed above may be used to select subvolumes that were not-yet selected. In other embodiments of the present invention, the same sub-supercube sampling pattern determined above may repeated. For example, a smaller volume may be selected from sub-supercube 900, then sub-supercube 970, then sub-supercube 980, etc.

Figure 8:
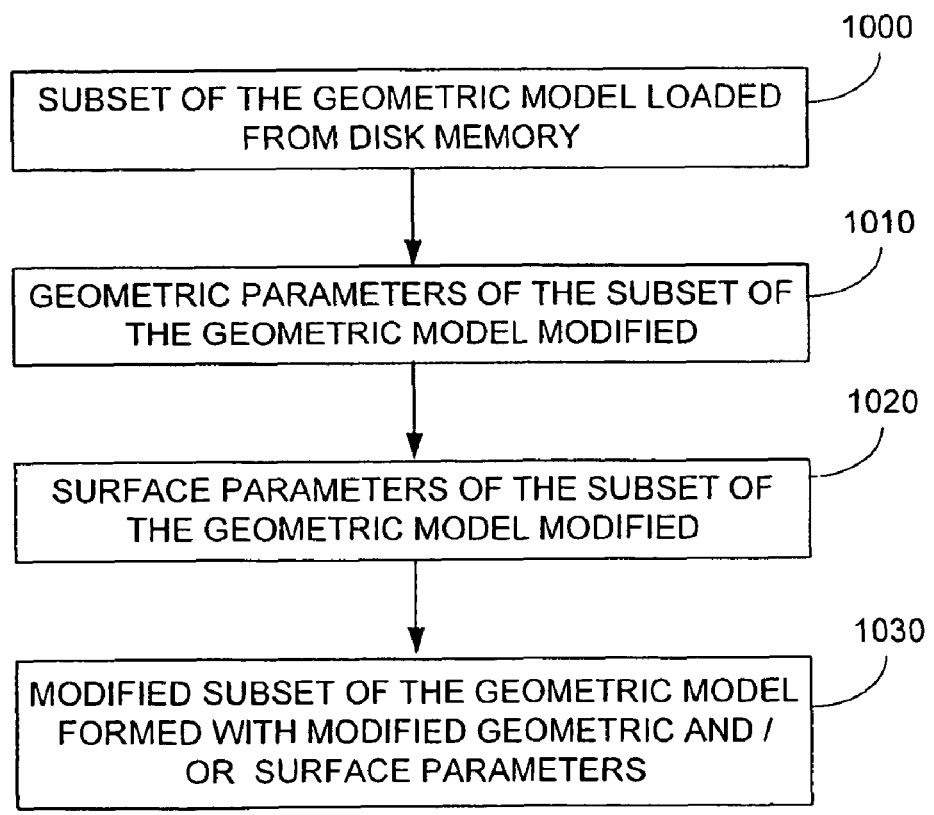
FIG. 8 illustrates a flow diagram according to embodiments of the present invention.

FIG. 8 illustrates a flow diagram according to embodiments of the present invention. More specifically, FIG. 8 provides a high-level illustration of embodiments for forming modified geometric elements as described in step 260.

Initially, based upon the sampling ratio or percentage previously determined, in this embodiment, only a percentage of the geometric elements are loaded into memory, step 1000. Next, the geometric parameters of the geometric elements in the geometric model are modified, step 1010. As will be illustrated below, in one embodiment of the present invention, the surface area of these geometric elements are increased to compensate for the removal, or non-loading, of the un-selected geometric elements. For example, if only half of the geometric elements of the original geometric model are loaded into memory, the surface areas of the loaded geometric elements are increased (e.g. by 100%). In some embodiments of the present invention, the surface area may be determined from the length, width, and height of an object, or the like. Additionally, one or more of the length, the width, the height, or other parameter (e.g. volume) of an object may be adjusted to increase the effective surface area of a geometric primitive. Further, in various embodiments of the present invention, the increase in surface area may be uniform or non-uniform among the selected different geometric elements.

To expedite calculation of the surface areas, it is assumed that the surfaces of the geometric elements each face forward in various embodiments (i.e., that we are using the area projected onto the screen). However, in other embodiments, the surface area for each geometric primitive may also be determined based upon the computed surface area normal to the viewing plane.

In various embodiments, it is recognized that the resized elements may not have the same expected depth complexity as the original elements. However, in some embodiments, the small difference can be ignored. In other embodiments, the depth complexity of the original elements may be predicted and the area of the unpruned elements may be adjusted so that the area on the screen covered by the visible portions of the scaled, unpruned elements remains the same as for the original elements.

In various embodiments of the present invention, for area preservation, the total area of an object visible by a camera is na, where "n" is the number of elements in the object, and where "a" is the average surface area of the individual elements. Pruning, according to the embodiments described herein, decreases the total area visible to the camera to nua, where u is defined as a fraction of the geometric elements that are unpruned, described above. In various embodiments, to compensate for the decrease in area, the area of the unpruned elements is scaled by an amount $s_{unpruned}$ so that:

$$(nu)(as_{unpruned}) = na.$$

Therefore $s_{unpruned} = 1/u$.

In one example, if an object includes 1,000 elements, and a subset of the elements (e.g. 100 elements) is used to represent the object, geometric properties of the 100 elements may be modified. In one example, the surface area of the 100 elements is increased 10 times, such that the net surface area of the object is approximately the same as the 1,000 element model. In various embodiments, the surface area may be increased by scaling one or two dimensions of each of the elements.

In various embodiments, surface parameters of the geometric elements are also updated, step 1020. In one embodiment, in this step, the surface colors of these geometric elements are modified to compensate for the removal of geometric elements compared to the original geometric model. Generally, when there are fewer geometric elements with the same color distribution for each geometric element, the variance for the fewer geometric elements increases. Additionally, as more geometric elements are added, the color variance decreases and the mean stays the same. Accordingly, to preserve the surface color variance of the original geometric model with fewer geometric elements, the colors for the fewer geometric elements in the updated geometric model are modified. In one embodiment, the variance is decreased in proportion to the decrease in geometric elements. A simplistic approximation may be if x % of leaves in a tree are loaded into memory, the color variance of the x % of the leaves should decrease by x to approximately maintain the original color variance.

In various embodiments of the present invention, for contrast (variance) preservation, from the central limit theorem, it is known that sampling more elements per pixel decreases the pixel variance. As a result, pruning elements in an object (i.e., sampling fewer elements) increases its contrast (i.e. results in a higher variance). As an example, notice how the pruned plant 1840 in FIG. 14C has a higher contrast than the unpruned plant 1800 in FIG. 14A. After compensation, the pruned plant 1880 in FIG. 14D has a similar contrast as pruned plant 1800 in FIG. 14A.

Generally, the variance of color of the elements in an object is:

$$\sigma_{elem}^2 = \sum_{i=1}^{n}(c_i - \bar{c})^2$$

In the relationship above, $c_i$ is the color of the ith element; c-bar is the mean color; and $\sigma^2$ is variance. Additionally, for other relationships described herein: $\alpha$ is an amount of color variance reduction, h is a z distance at which half the elements are pruned; k is the number of elements per pixel; s is the area scaling correction factor; t is the size of transition region for fading out pruned elements; u is the fraction of elements unpruned; x is the position of an element in the reverse pruning order; and z is the distance from the camera.

When k elements are sampled per pixel, the expected variance of the pixels is related to the variance of the elements by:

$$\sigma_{pixel}^2 = \sum_{i=1}^{k}(w_i)^2 \sigma_{elem}^2$$

In this relationship, the weight $w_i$ is the amount the ith element contributes to the pixel. For this analysis, it is assumed that each element contributes equally to the pixel with weight 1/k:

$$\sigma_{pixel}^2 = \sum_{i=1}^{k}\left(\frac{1}{k}\right)^2 \sigma_{elem}^2 = k\left(\frac{1}{k}\right)^2 \sigma_{elem}^2 = \frac{1}{k}\sigma_{elem}^2$$

The pixel variance when the unpruned object is rendered is:

$$\sigma_{unpruned}^2 = \sigma_{elem}^2 / k_{unpruned}$$

and the pixel variance when the pruned object is rendered is:

$$\sigma_{pruned}^2 = \sigma_{elem}^2 / k_{pruned}$$

In various embodiments, these can be made the substantially similar or the same by altering the colors of the pruned elements to bring them closer to the mean:

$$c'_i = \bar{c} + \alpha(c_i - \bar{c})$$

which reduces the variance of the elements to:

$$\sigma'^2_{elem} = \sum_{i=1}^{n}(c'_i - \overline{c})^2$$
$$= \sum_{i=1}^{n}(\overline{c} + \alpha(c_i - \overline{c}) - \overline{c})^2$$
$$= \alpha^2 \sum_{i=1}^{n}(c_i - \overline{c})^2$$
$$= \alpha^2 \sigma^2_{elem}$$

which in turn reduces the variance of the pixels to:

$$\sigma'^2_{pruned} = \sigma'^2_{elem}/k_{pruned}$$
$$= \sigma^2_{elem}\alpha^2/k_{pruned}$$
$$= \sigma^2_{unpruned}\alpha^2 k_{unpruned}/k_{pruned}$$

In this analysis, when the following relationship holds:
$\alpha^2 = k_{pruned}/k_{unpruned}$
The desired requirement holds true:

$\sigma'_{pruned}{}^2 = \sigma_{unpruned}{}^2$

Because screen size varies as $1/z^2$, it would be expected that $k_{unpruned} = k_z^2$, where $k_1$ is the value of k at z=1, which can be estimated by dividing n by the number of pixels covered by the object when z=1. Similarly, it is expected that $k_{pruned} = uk_{unpruned} = uk_z^2$, so that $\alpha^2 = u$. Many renderers, however, have a maximum number of visible objects per pixel $k_{max}$ (e.g., 64 if the renderer point-samples 8×8 locations per pixel), and this complicates the formula for $\alpha$:

$$\alpha^2 = \frac{\min(uk_1 z^2, k_{max})}{\min(k_1 z^2, k_{max})}$$

Figure 13B:
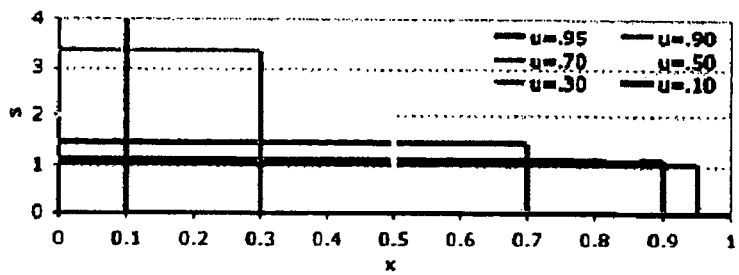
Figure 13C:
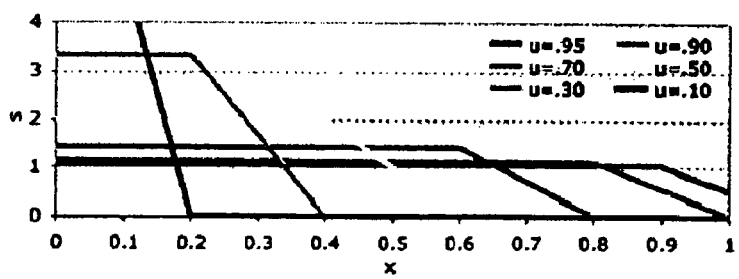
Figure 13D:
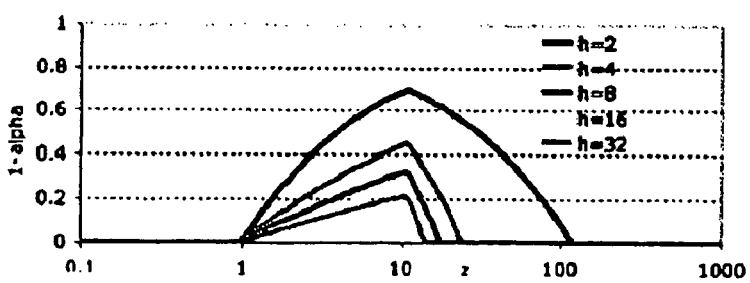

FIG. 13D illustrates a function of z for values of h. Notice that the contrast only changes in the middle distance. When the object is close, the contrast is unchanged because there is no pruning. When the object is far away, the contrast is unchanged because there are more than $k_{max}$ unpruned elements per pixel, so that $k_{max}$ elements contribute to the pixel in both the pruned and unpruned cases. The maximum contrast difference occurs at:

$z = \sqrt{k_{max}/k_1}$.

The smaller u is at this distance, the larger this maximum will be; contrast correction is thus more important with more aggressive pruning. Examples of contrast correction are illustrated in FIG. 14D, below.

In various embodiments, if there are different types of elements in a scene (e.g. leaves and grass), each type may need its own independent contrast correction. Accordingly, c-bar should be based on the final shaded colors of the elements, but may be approximated by reducing the variance of the shader inputs.

Returning to FIG. 8. In the present embodiments, the updated or modified geometric object is then formed from the updated geometric parameters and/or updated surface parameters, step 1030.

FIGS. 9A-D illustrate an example according to an embodiment of the present invention. More specifically, FIGS. 9A-D illustrate examples where geometric parameters of primitives in a geometric model are modified.

Figure 9A:
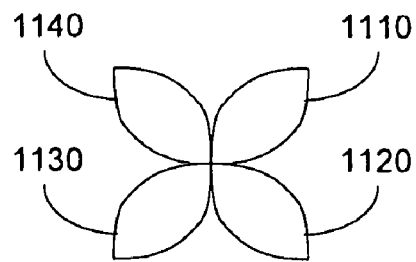
FIGS. 9A-D illustrate an example according to an embodiment of the present invention.
Figure 9B:
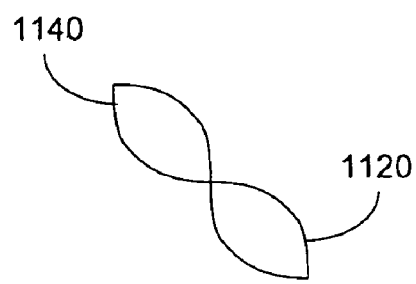

In FIG. 9A, a portion of a original geometric model of a tree 1100 is illustrated including four leaves 1110, 1120, 1130, and 1140. In FIG. 9B, according to techniques described above, only leaves 1120 and 1140 are loaded from memory (e.g. disk memory) into program memory. As can be seen, the surface area of leaves 1120 and 1140 are approximately one half the surface of leaves 1110, 1120, 1130 and 1140 together.

Figure 9C:
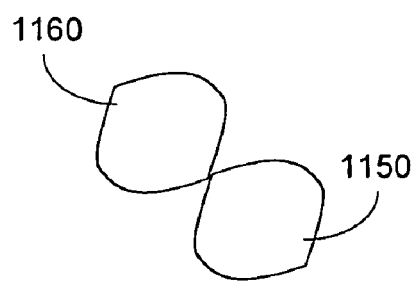
Figure 9D:
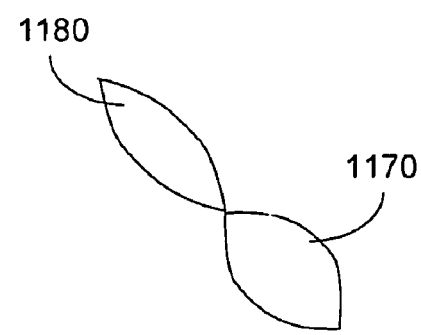

Next, in FIG. 9C, the width of leaf 1120 is increased to form leaf 1150, and the width of leaf 1140 is increased to form leaf 1160. In the present embodiments, the surface area of leaves 1150 and 1160 were increased to approximate the total surface area of leaves 1110-1140. In other embodiments of the present invention, one or more other parameters of leaf 1120 or leaf 1140 could have been modified. For example, in some embodiments, the length could have been modified, the width and length could have been modified, or the like. In other embodiments, the leaves may be increased in different ways, as illustrated In FIG. 9D. In this example, a width of leaf 1120 is increased to form leaf 1170 and the width and length of leaf 1140 is increased to form leaf 1180. Again, in this example, the total surface area of leaves 1170 and 1180 should approximate the surface area of leaves 1110-1140.

In some embodiments of the present invention, an object may have large changes in size within a shot or scene. For example, a tree increases in size on the screen as the viewing plane moves towards the tree. In one embodiment of the present invention, when the tree is in the distance, using embodiments of the present invention, only a percentage (e.g. 25%, 40%) of the leaves on the tree are loaded for rendering purposes. When the tree is close-up, all the leaves (e.g. 100%) on the tree are loaded for rendering purposes. In some embodiments of the present invention, to avoid having to compensate for changes in percentage of the geometric elements for an object within the scene, a single loading percentage is used in the shot. More specifically, the largest percentage of geometric elements of the object is used for rendering purposes. For example, where the percentage of the loaded geometric elements is a minimum of 25% and maximum of 75% in the shot, 75% the leaves may be loaded into memory and used for rendering, even when the tree is far away.

In some embodiments of the present invention, the inventor has determined that it is advantageous to support different percentages of geometric elements within a shot, a scene, or the like. Accordingly, the inventor has developed methods for smoothing a transition between the different percentages. In one embodiment, geometric parameters of some of the geometric elements may be modified to provide such a transition.

In various embodiments of the present invention, as elements are pruned during an animation, they should gradually fade out instead of just abruptly popping off. In the example in FIG. 13B, elements are pruned abruptly, and in FIG. 13C, elements can be pruned gradually. This can be done by gradually making the elements either more transparent or smaller as they are pruned. The later is shown in FIG. 13C, where the size t of the transition region is 0.1. The orange line shows that for a desired pruning level of 70% (u=0.3), the first 20% of the elements in the reverse pruning order (x<=u−t=0.2) are enlarged by 1/u=10/3 and the last 60% (x>u+t=0.4) are completely pruned. From x=0.2 to x=0.4, the areas gradually decrease to 0. As the camera zooms in and u increases, the elements at x=0.4 are gradually enlarged, reaching their fully-enlarged size when u=0.5 (the yellow line). In these examples, the area under each line is the total pruned surface area and is constant.

Figure 10A:
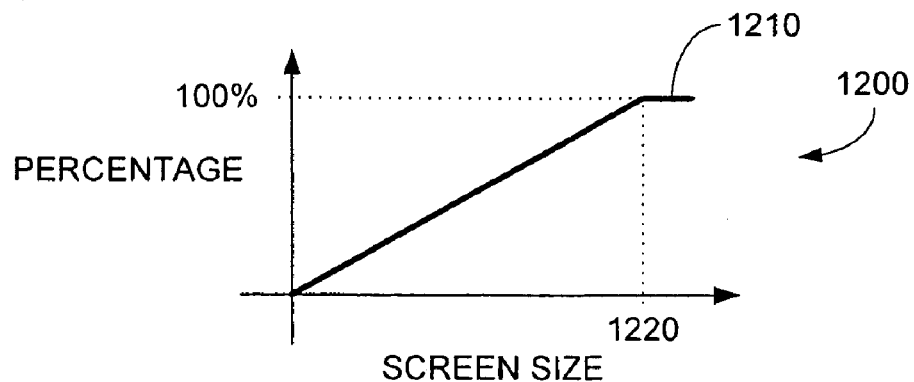
FIGS. 10A-C illustrate an example according to an embodiment of the present invention.
Figure 10B:
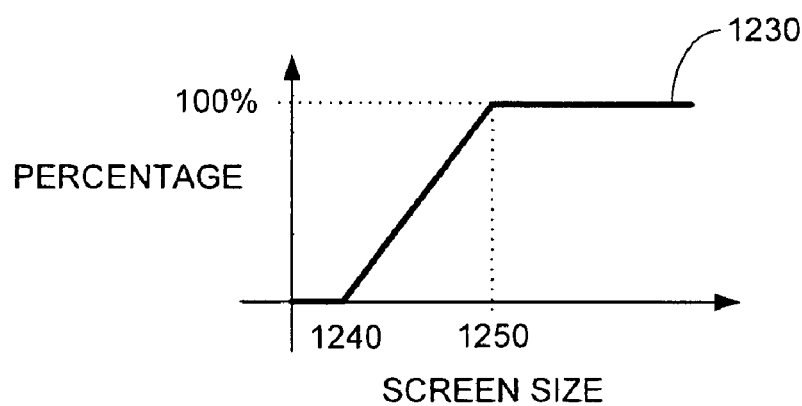
Figure 10C:
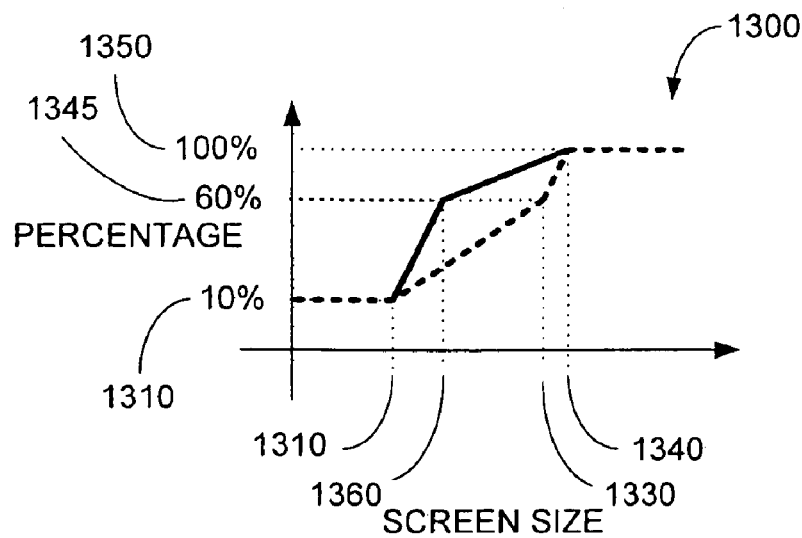

FIGS. 10A-C illustrate an example according to an embodiment of the present invention. More specifically, FIGS. 10A-C illustrate examples for transitioning between different geometric element loading percentages.

FIG. 10A illustrates a graph 1200 plotting the use of geometric models of an object versus distance (or screen size). As can be seen in graph 1200, a screen size for an object is plotted against geometric loading percentage. In one embodiment, relationship 1210 illustrates a relationship where the loaded geometric primitives vary from a very small percentage (e.g. zero) when the object screen size is very small, to 100% when screen size 1220 of the object is reached.

FIG. 10B illustrates another embodiment. In FIG. 10B, relationship 1230 illustrates a relationship where the loaded geometric primitives begin from a very small percentage until the object screen size reaches a threshold 1240. After that, the percentage increases to 100% when screen size 1250 is reached.

FIG. 10C illustrates additional embodiments with a relationships 1300. In this embodiment, relationships 1300 may have more than one rate of change. In this example, below a screen size of 1310, the object is represented by a minimum percentage 1320 (e.g. 10%). Next, as the screen size increases, the percentage also increases at a first rate and then at a second rate. In one example, in one of the relationships 1300, once screen size 1330 is reached, the percentage is 1345 (e.g. 60%); and once the object screen size reaches 1340, the percentage jumps to 1350 (e.g. 100%). As another example, in one of the relationships 1300, once screen size 1360 is reached, the percentage is 1345 (e.g. 60%); and once the object screen size reaches 1340, the percentage jumps to 1350 (e.g. 100%). Additionally, in various embodiments, the rate of increase between the minimum percentage and maximum percentage may be linear, non-linear, or the like.

In the above examples, a smooth transition is desired in some embodiments during transitions of percentages. For example, in FIG. 10B, a transition is between 0% at 1240 to 100% at 1250; and in FIG. 10C, a transition is, for example, between 60% before 1310, and 100% after 1340. To implement these transitions, one or more additional graphical parameters of geometric elements may be modified, as will be discussed below.

Figure 11A:
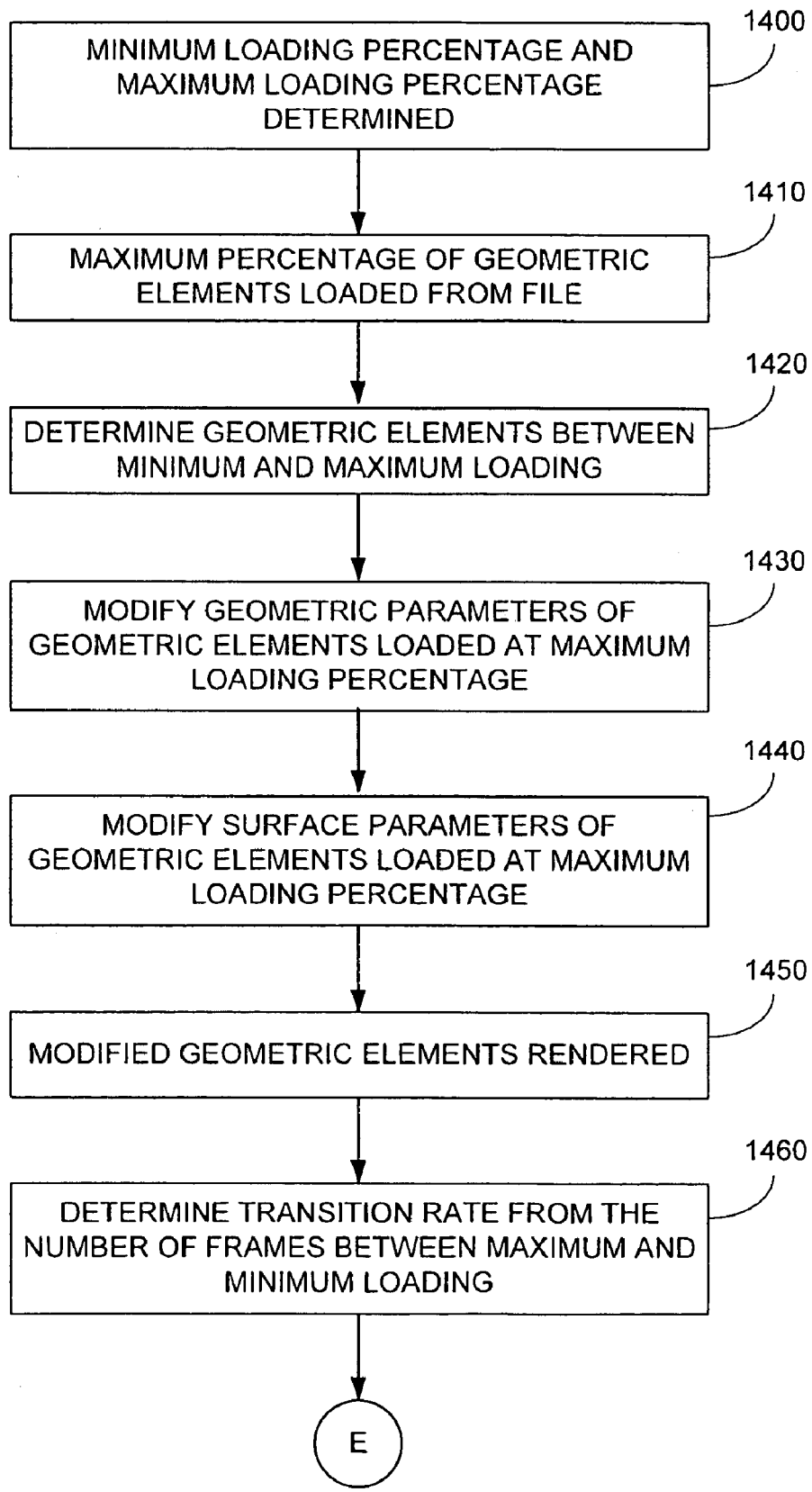
FIGS. 11A-B illustrate block diagrams of a process according to an embodiment of the present invention.
Figure 11B:
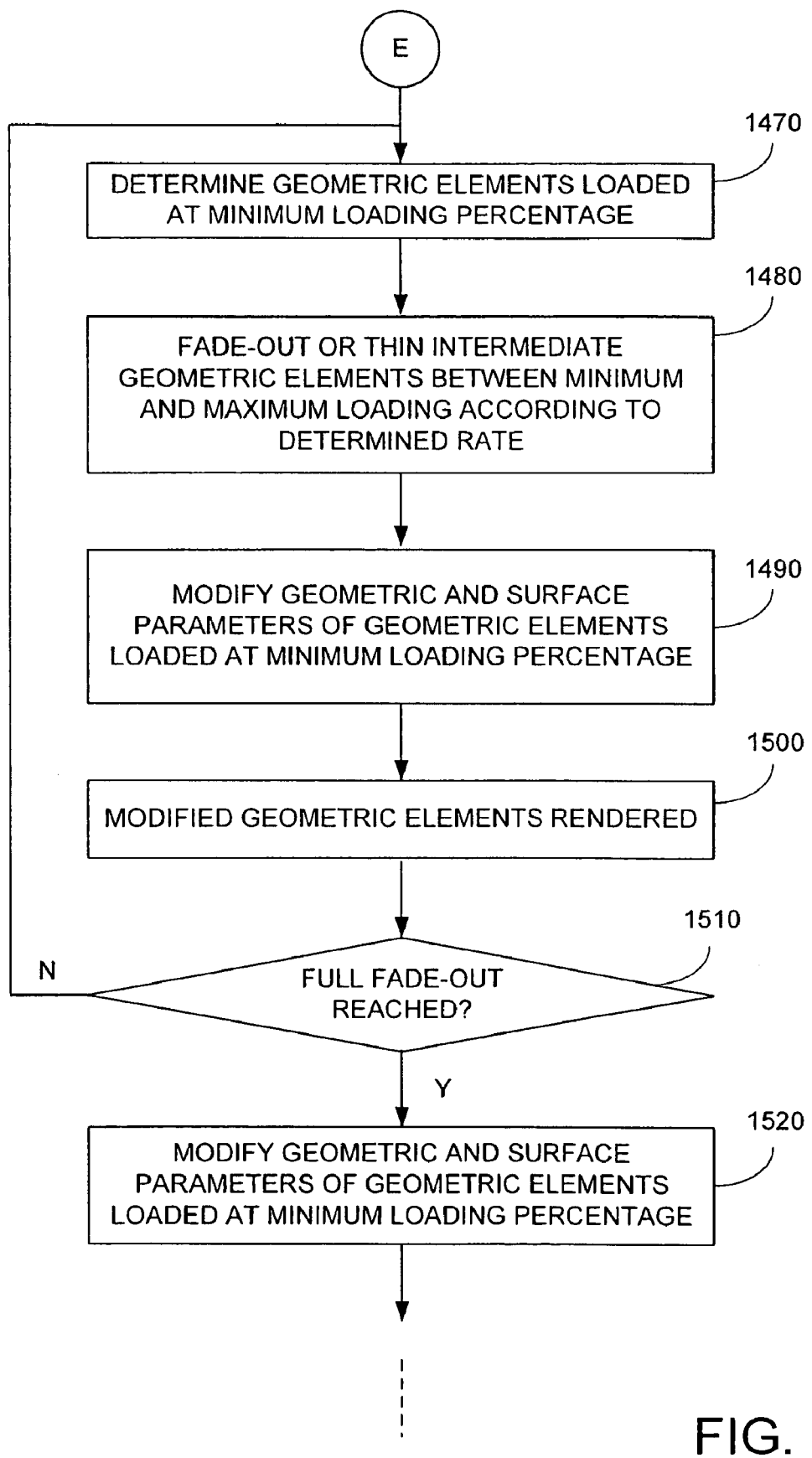

FIGS. 11A-B illustrate block diagrams of a process according to an embodiment of the present invention. More specifically, FIGS. 11A-B illustrates a process of transitioning between loading percentages with reduced "pop-on" and/or "pop-off."

FIG. 11A illustrates a embodiment when there is a transition between two different sampling percentages. In this embodiment, the sampling percentages for an object in two images are determined, step 1400. For example, a minimum sampling percentage for the object is 40% and the maximum sampling percentage for the object is 60% in a shot.

In an embodiment where the object is moving away the viewing plane, the geometric elements of the object within the maximum percentage are identified, step 1410. In one embodiment, the geometric elements are arranged in sampling order in the file. The "intermediate" geometric elements to be removed during the shot are also identified, step 1420. These "intermediate" geometric elements are typically the geometric elements between the minimum geometric elements and the maximum geometric elements in this shot.

In the present embodiment, the geometric elements determined by the maximum percentage are then geometrically modified, as discussed in FIGS. 8 and 9A-D, to increase the effective surface area, step 1430. Additionally, the surface parameters are modified, for example, to reduce the color variance, as discussed in FIG. 8, step 1440. The modified geometric primitives are then rendered for the image, step 1450.

In some embodiments of the present invention, to reduce the amount of "pop-off" when transitioning between percentages, a "thinning" or a "fading-out" technique is used for the geometric primitives. More specifically, based upon the number of image frames between the maximum percentage and minimum percentage, a rate of thinning or fading out is determined, step 1460. For example, if there are 10 frames, the removed geometric elements may be thinned or faded-out 10% for each frame.

In the present embodiment, for the next frame, the minimum percentage of geometric primitives are then identified, step 1470. In the present embodiment, these geometric primitives retain "full" thickness and are not "faded-out." The intermediate geometric elements are thinned or faded-out at the rate determined in step 1460, step 1480. Next, geometric and surface parameters (for the geometric elements may again be adjusted, step 1490, and the modified geometric elements are then rendered for the image, step 1500. In the present embodiment, the process repeats until the removed geometric elements are thinned-out or faded out, step 1510. After that, the rendering continues for only the geometric elements in the minimum percentage of geometric elements, step 1520.

A similar process is used when an object moves towards the viewing plane. For example, geometric elements between the maximum percentage and the minimum percentage are identified and faded in at a smooth rate. In various embodiments, the rate may be linear, or non-linear.

Figure 12A:
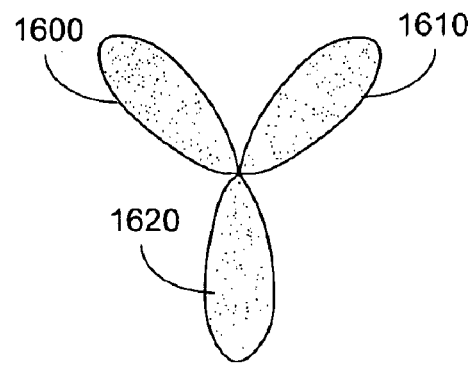
FIGS. 12A-D illustrate an example according to an embodiment of the present invention.
Figure 12B:
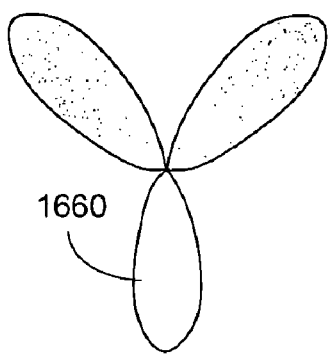
Figure 12C:
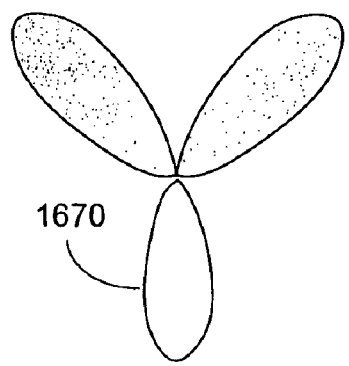
Figure 12D:
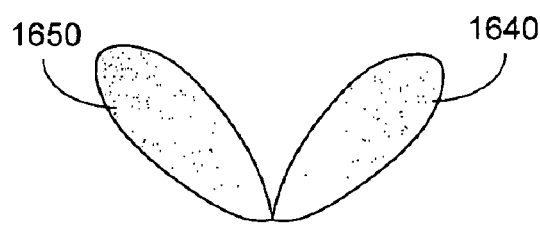

FIGS. 12A-D illustrate an example according to an embodiment of the present invention. In this example, an object includes three leaves 1600-1620. In FIG. 12A, all leaves are rendered in image 1610. In FIG. 12D, as illustrated, only two leaves 1640 and 1650 remain to represent the object. As shown, the remaining leaves 1640 and 1650 are geometrically modified to maintain the surface area of the original leaves 1600-1620. In this example, leaf 1620 is to be removed from FIG. 12A and faded-out as seen by leaves 1660 and 1670 in FIGS. 12B and 12C, respectively.

Many changes or modifications are readily envisioned. In light of the above disclosure, one of ordinary skill in the art would recognize that many different techniques may be used for the different steps. For example, when pruning, for geometric compensation, a variety of geometric parameters may be modified, such as thickness, depth, width, length, and the like. As another example, different methods for transitioning between different pruning levels include: fading-in, fading-out, increasing or decreasing transparency, and the like.

FIGS. 14A-D illustrate additional examples according to embodiments of the present invention. In particular, FIG. 14A illustrates an image 1800 of a bush rendered with a full geometric model of the bush. Image 1810 is a close-up of image 1800.

In FIG. 14B, an image 1820 is a bush rendered with 90% of the leaves pruned-out. In other words, only 10% of the leaves are used to represent the bush. Image 1830 is a close-up of image 1820. The sparseness of the leaves can be seen in image 1830. As can be determined, image 1820 is visually different from image 1800 on account of the rendering with only 10% of the leaves.

In FIG. 14C, an image 1840 of a bush rendered with only 10% of the leaves. Additionally, geometric correction or adjustment for the 10% of the leaves is performed according to the embodiments described above. As can be seen in image 1850, a close-up of image 1840, the geometric description of the leaves 1860 are different from the leaves 1870 in image 1810. In this example, the surface area of the leaves is increased.

In FIG. 14D, an image 1880 of a bush rendered with only 10% of the leaves is shown that have geometric correction or adjustment as described above. Additionally, correction of the surface parameters is performed according to the embodiments described above. As can be seen in image 1890, a close-up of image 1840, the surface color of the leaves 1900 are different from the surface color leaves 1860 in image 1850. In this example, the variance of color is decreased. As a net result, the bush in image 1880 appears closer to the bush in image 1800, than the bush in image 1840, because of the color variance decrease.

In additional embodiments, many other criteria for determining a reverse pruning order for an object are contemplated. More generally, in addition to or instead of the spatial considerations illustrated in FIGS. 7A-C, one or more criteria for selecting geometric elements in the reverse pruning order that can best represent the average and variance of the geometric elements is desired. Mathematically, if S represents all the geometric elements, S' represents a subset of the geometric elements in the reverse pruning order (i.e. S' is a subset of S), and f(X) represents properties of the geometric elements, what is desired is $f(S') \approx f(S)$. In the various embodiments, f(X) may represent the average color of the geometric elements, f(X) may represent the variance in color, f(X) may represent a function of volume, f(X) may represent a function of surface normals, f(X) may represent a function of surface glossiness, f(X) may represent a function of surface texture, f(X) may represent a function of reflection direction, and the like.

In various embodiments of the present invention, engineers working with the inventor have implement the above techniques and have achieved a reduction in amount of object data loaded from memory and/or used in a scene for computer animation purposes of up to 90%. Additionally, in various embodiments, the increase in speed for rendering certain scenes has been up to 10 times greater.

In other embodiments, without the reduction in amount of object data loaded from memory and/or used for computer animation purposes, rendering of complex scenes with a great number of geometric elements would have previously been unpractical in terms of rendering time and/or computer memory requirements. As an example, a scene with a fifty thousand trees each having five hundred thousand leaves might not be practical to render. However, using techniques described above to reduce the number of geometric elements used for animation purposes, complex scenes can now be rendered in a reasonable amounts of time.

Figure 14E:
Figure 14F:
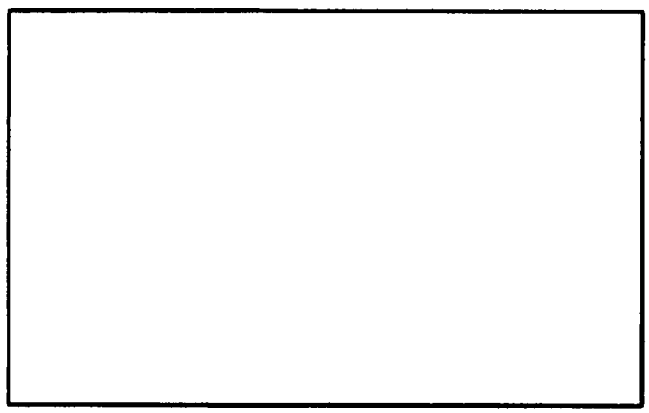

FIGS. 14E and 14F illustrate various embodiments of the present invention. In this example, the bush illustrated in FIG. 14A has a screen size illustrated in FIG. 14E, and the bush illustrated in FIG. 14D has a screen size illustrated in FIG. 14F. Close-up, the bush in FIG. 14D looks different from the bush in FIG. 14A, however, the difference is difficult to discern when viewing the bushes in FIG. 14E and FIG. 14F.

Figure 15:
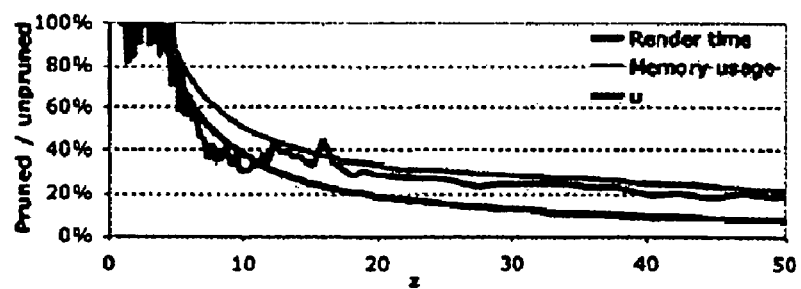
FIG. 15 illustrates a performance example according to various embodiments of the present invention.

FIG. 15 illustrates a performance example according to embodiments of the present invention. In particular, FIG. 15 illustrates memory usage and rendering time for the plants/bushes in FIG. 14D as it recedes into the distance using embodiments of the present invention. In various examples, scene descriptors including plants having over one hundred million leaves were renderable using various embodiments. These examples required so much memory, that without pruning they were not readily renderable using a conventional rendering engine. However, using embodiments described herein, rendering using a conventional rendering engine was possible.

As discussed above, models of an object can be dynamically formed when the model is required. In other embodiments of the present invention, using techniques described above, models of an object could also be dynamically created before they are needed. In such embodiments, a loading percentage would be specified. Next, the techniques described above are used to load a subset of the geometric elements and modify the properties of the loaded geometric elements. The reduced-complexity model can then be stored. Later, the reduced-complexity model can be retrieved for rendering, or other purpose. Such embodiments could reduce the rendering pipeline time, for example, since the modifications to the properties of the geometric elements are pre-computed.

Embodiments of the present invention may also be combined with the techniques described in co-pending U.S. patent application Ser. No. 10/428,324, filed Apr. 30, 2003. For example, a maximum percentage of geometric elements is determined for a shot. Then that percentage of geometric elements is loaded from disk to memory. Then the object is rendered, according to the cited patent application, for a series of images within a shot. Other combinations of embodiments of the present invention and the cited patent application are also contemplated.

Embodiments of stochastic pruning described herein may provide automatic, straightforward level-of-detail methods that greatly reduce the geometric complexity of objects with large numbers of simple, disconnected elements. This type of complexity is not effectively addressed by previous methods. The techniques fit well into a rendering pipeline, and do not require knowledge of how the geometry was generated. Various embodiments are also easy to implement: just randomly shuffle the elements into a file and read just the unpruned elements.

As seen in various embodiments, above, all geometric elements of an object, e.g. leaves, hair, etc. need not be used when rendering the object. Instead, less than all of the geometric elements, a subset of the geometric elements, of an object may be retrieved, and modified to represent all the geometric elements. As illustrated above, the modifications to the subset of geometric elements are performed with an emphasis on maintaining the global statistics of the object. For example, the geometric statistics (e.g. surface area, distribution of normals) of the modified subset of geometric elements should approximately match the geometric statistics (e.g. surface area, distribution of normals) of all the geometric elements of the object; the surface statistics (e.g. contrast, color variance) of the modified subset of geometric elements should approximately match the surface statistics (e.g. contrast, color variance) of all the geometric elements of the object; and the like. Various embodiments of the present invention thus modify the subset of geometric elements based upon which geometric elements are selected for the subset of geometric elements and the global statistics of the object, the latter which is known. In other words, the modifications of the geometric elements do not depend upon which geometric elements are "pruned," i.e. they are "pruned element agnostic." In contrast, previous LOD simplification schemes typically require loading of the entire object into memory, pruning vertices, and modifying positions of vertices adjacent to the pruned vertices, i.e. they are "pruned vertex dependent."

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method performed by a computer system programmed to perform the method comprises:
   opening by the computer system a model of an object, wherein the model comprises a plurality of three-dimensional geometric elements, wherein a three-dimensional geometric element is an element having at least a two-dimensional surface that is positioned at coordinates in a three-dimensional space;
   determining by the computer system a subset of three-dimensional geometric elements from the plurality of three-dimensional geometric elements of the model;
   modifying by the computer system properties of one or more of the three-dimensional geometric elements in the subset of three-dimensional geometric elements to form a subset of modified three-dimensional geometric elements; and
   using by the computer system at least one modified three-dimensional geometric elements from the subset of modified geometric elements to represent at least one three-dimensional geometric element of the model of the object that is not within the subset of three-dimensional geometric elements;
   determining by the computer system a rendered image in response to the subset of modified three-dimensional geometric elements.

2. The method of claim 1 wherein modifying by the computer system the properties of the one or more three-dimensional geometric elements comprises modifying, by the computer system geometric parameters of the one or more three-dimensional geometric elements from the subset of three-dimensional geometric elements.

3. The method of claim 2 wherein modifying by the computer system the geometric parameters is selected from a group of operations performed consisting of:
   modifying by the computer system surface areas of the one or more three-dimensional geometric elements from the subset of three-dimensional geometric elements, modifying by the computer system thicknesses of the one or more three-dimensional geometric elements from the subset of three-dimensional geometric elements, modifying by the computer system widths of the one or more three-dimensional geometric elements from the subset of three-dimensional geometric elements, modifying by the computer system heights of the one or more three-dimensional geometric elements from the subset of three-dimensional geometric elements, modifying by the computer system volume of the one or more three-dimensional geometric elements from the subset of three-dimensional geometric elements, modifying by the computer system two-dimensional projected surface area of the one or more three-dimensional geometric elements from the subset of three-dimensional geometric elements.

4. The method of claim 1 wherein modifying by the computer system the properties of the one or more three-dimensional geometric elements comprises modifying by the computer system surface parameters of the one or more three-dimensional geometric elements from the subset of three-dimensional geometric elements.

5. The method of claim 4 wherein the surface parameters are selected from a group consisting of:
   surface color, surface texture, bump map, displacement map, average reflection, transparency, shading parameters.

6. The method of claim 1 wherein using the at least one modified three-dimensional geometric elements comprises providing by the computer system the subset of modified three-dimensional geometric elements to a processing module;
   wherein the processing module is selected from a group consisting of:
   a shadow mapping module, a shadow baking module, a simulation module, a radiosity module, a finite element analysis module, a rendering module.

7. The method of claim 1 wherein determining the subset of three-dimensional geometric elements from the plurality of three-dimensional geometric elements of the model comprises:
   determining by the computer system a loading indicia for the plurality of three-dimensional geometric elements in response to an importance criteria of the model, wherein the importance criteria is selected from a group consisting of:
   size of the model in the scene, contrast levels of the model in the scene, illumination level of the model in the scene, transparency of objects in front of the object in the scene, whether the object is a primary object or a secondary object in the scene, whether the object is in focus in the scene, whether the model is to be imaged as a reflection in a scene, motion of the object in the scene, number of elements per pixel.

8. The method of claim 7 wherein modifying the properties of the one or more three-dimensional geometric elements comprises modifying by the computer system parameters of the one or more three-dimensional geometric elements in the first subset of three-dimensional geometric elements in response to the loading indicia;
   wherein the loading indicia is selected from a group consisting of:
   a number of three-dimensional geometric elements, a percentage of the plurality of three-dimensional geometric elements, a number of three-dimensional geometric elements per pixel, a percentage of the subset of three-dimensional geometric elements to the plurality of three-dimensional geometric elements;
   wherein the parameters are selected from a group consisting of:
   geometric parameters, surface parameters.

9. The method of claim 1 further comprising storing a representation of the rendered image in a tangible media.

10. A tangible medium storing the representation of the rendered image formed according to the process described in claim 9.

11. The method of claim 1 wherein the plurality of three-dimensional geometric elements comprises selected three-dimensional geometric elements and unselected three-dimensional geometric elements; and
   wherein the subset of modified three-dimensional geometric elements represents the selected three-dimensional geometric elements and the unselected three-dimensional geometric elements.

12. A computing system programmed to determine a representation of an object comprises:
- a mass storage memory configured to store a geometric model of the object including a plurality of three-dimensional geometric elements, and a specification of a scene that includes the object, wherein a three-dimensional geometric element is an element having at least a two-dimensional surface that is positioned at coordinates in a three-dimensional space;
- a random access memory coupled to the mass storage memory;
- a processor coupled to the random access memory and to the mass storage memory, wherein the processor is programmed to determine a subset of three-dimensional geometric elements from the plurality of three-dimensional geometric elements in the geometric model of the object to retrieve from the mass storage memory, wherein the processor is programmed to retrieve the subset of the three-dimensional geometric elements from the memory, wherein the processor is programmed to modify parameters of one or more three-dimensional geometric elements from the subset of three-dimensional geometric elements to form a subset of modified three-dimensional geometric elements, wherein the processor is programmed to use at least one modified three-dimensional element from the subset of modified geometric elements as a representation of at least one three-dimensional geometric element of the model of the object that is not within the subset of three-dimensional geometric elements; and
- wherein the mass storage memory is also configured to stream the subset of the three-dimensional geometric elements to the random access memory;
- wherein the random access memory is configured to store the subset of the three-dimensional geometric elements, and wherein the random access memory is configured to store the subset of modified three-dimensional geometric elements; and
- wherein the processor is also programmed to determine a rendered image in response to the subset of modified three-dimensional geometric elements.

13. The computing system of claim 12 wherein the processor is also programmed to determine a sampling percentage;
- wherein the processor is programmed to determine the subset of three-dimensional geometric elements from the plurality of three-dimensional geometric elements in response to the sampling percentage.

14. The computing system of claim 13 wherein the parameters of the at least one three-dimensional geometric element that are modified comprise geometric parameters.

15. The computing system of claim 14 wherein the geometric parameters are selected from a group consisting of:
- width, depth, length, height, thickness, volume, two-dimensional projected surface area, surface normal.

16. The computing system of claim 13 wherein the parameters of the at least one three-dimensional geometric element that are modified comprise surface parameters.

17. The computing system of claim 16 wherein the surface parameter are selected from a group consisting of:
- surface color, transparency, surface texture, bump map, displacement map, reflection, shading parameters.

18. The computing system of claim 13 wherein the processor is programmed to select the parameters to modify in response to the sampling percentage;
- wherein the parameters are selected from a group consisting of:
- geometric parameters, surface parameters.

19. The computing system of claim 12 wherein the processor is programmed to provide the subset of modified three-dimensional geometric elements to a processing module; and
- wherein the processing module is selected from a group consisting of:
- a shadow mapping module, a shadow baking module, a simulation module, a radiosity module, a finite element analysis module, rendering module.

20. A computer program product comprises a tangible media including non-transitory executable software code for a computer system including a processor, the computer program product including:
- code that directs the processor to determine a desired level of detail for an object positioned within a scene;
- code that directs the processor to retrieve a subset of three-dimensional geometric elements from a plurality of three-dimensional geometric elements associated with a geometric model of the object in response to the desired level of detail for the object, wherein a three-dimensional geometric element is an element having at least a two-dimensional surface that is positioned at coordinates in a three-dimensional space;
- code that directs the processor to modify at least one parameter of one or more three-dimensional geometric elements from the subset of three-dimensional geometric elements to form a subset of modified three-dimensional geometric elements; and
- code that directs the processor to provide at least one modified three-dimensional element from the subset of modified of three-dimensional geometric elements to a processing module to represent at least one three-dimensional geometric element of the model of the object that is not within the subset of three-dimensional geometric elements;
- code that directs the processor to render an image of object in response to the subset of modified three-dimensional geometric elements.

21. The computing system of claim 12, wherein the subset of three-dimensional geometric elements are selected from the plurality of three-dimensional geometric elements;
- wherein an unselected subset of three-dimensional geometric elements remain not selected from the plurality of three-dimensional geometric elements; and
- wherein the subset of modified three-dimensional geometric elements represents the subset of three-dimensional geometric elements and the unselected subset of three-dimensional geometric elements.

22. The computer program product of claim 20 wherein the at least one parameter is selected from a group consisting of:
- thickness, width, height, volume, surface normal, 2D surface projection.

23. The computer program product of claim 20 wherein the at least one parameter is selected from a group consisting of:
- surface color saturation, surface color lightness, surface texture, surface normal, transparency, reflectivity, shading parameters.

24. The computer program product of claim 20 wherein the desired level of detail for the object increases as a number of three-dimensional geometric elements in the subset of three-dimensional geometric elements increases.

25. The computer program product of claim 20 wherein the desired level of detail for the object increases as the object is moved towards a viewing plane in the scene.

26. The computer program product of claim 20 wherein the processing module is selected from a group consisting of a shadow mapping module, a shadow baking module, a simulation module, a radiosity module, a finite element analysis module, a rendering module.

27. The computer program product of claim 20 wherein code that directs the processor to determine the desired level of detail for the object positioned within the scene comprises code that directs the processor to determine an importance criteria of the model, wherein the importance criteria is selected from a group consisting of:

position of the object in the scene, size of the object in the scene, contrast levels of the object in the scene, illumination level of the object in the scene, whether the object is in motion, whether the object is a primary or a secondary object in the scene, whether the object is to be input into a simulator, whether the object is to be imaged as a reflection in a scene, whether the object is in focus in the scene, number of elements sampled per pixel.

28. The computer program product of claim 20 wherein the desired level of detail for an object is determined at least in part by a predetermined minimum number of three-dimensional geometric elements per output pixel.

29. The computer program product of claim 20 wherein the plurality of three-dimensional geometric elements includes the subset of three-dimensional geometric elements that are retrieved and an unretrieved set of three-dimensional geometric elements; and wherein the subset of modified three-dimensional geometric elements represents the set of three-dimensional geometric elements that are retrieved and the unretrieved set of three-dimensional geometric elements.

30. A computer implemented method performed by a computer system including a processor programmed to perform the method comprises:

using by the computer system a subset of modified three-dimensional geometric elements to render a representation of an object in an image, and at least one modified three-dimensional element from the subset of modified three-dimensional geometric elements as a representation of at least one three-dimensional geometric element that is not within a subset of three-dimensional geometric elements, wherein a three-dimensional geometric element is an element having at least a two-dimensional surface that is positioned at coordinates in a three-dimensional space; and storing by the computer system the image in a tangible media, wherein a plurality of three-dimensional geometric elements are associated with global statistics and represent a model of the object, wherein the subset of three-dimensional geometric elements comprises a selected subset of the plurality of three-dimensional geometric elements, and wherein the subset of modified three-dimensional geometric elements comprises the selected subset of three-dimensional geometric elements that are modified in response to the global statistics.

31. The method of claim 30 wherein the plurality of three-dimensional geometric elements comprises an unselected subset of three-dimensional geometric elements; and wherein the subset of modified three-dimensional geometric elements comprises the subset of three-dimensional geometric elements that are modified independent from the unselected subset of three-dimensional geometric elements.

32. The method of claim 30 wherein the global statistics are selected from a group consisting of:

surface area, contrast, and color variance.

33. The method of claim 30 wherein each three-dimensional geometric element from the subset of three-dimensional geometric elements are modified independent of each other.

34. The method of claim 30 wherein the subset of modified three-dimensional geometric elements represent a first subset of three-dimensional geometric elements and a second subset of three-dimensional geometric elements;

wherein the plurality of three-dimensional geometric elements comprises the first subset of three-dimensional geometric elements and the second subset of three-dimensional geometric elements, wherein the second subset of three-dimensional geometric elements are three-dimensional geometric elements that are not within the selected subset of the plurality of three-dimensional geometric elements.

* * * * *